US008291082B2

(12) United States Patent
Tolson et al.

(10) Patent No.: US 8,291,082 B2
(45) Date of Patent: *Oct. 16, 2012

(54) ARCHITECTURE FOR A SYSTEM OF PORTABLE INFORMATION AGENTS

(75) Inventors: Michael Tolson, Corte Madera, CA (US); Jean-Christophe Arnulfo, Paris (FR); Brice Rive, Paris (FR)

(73) Assignee: H.E.B. LLC, Ft. Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,066

(22) Filed: Nov. 1, 2011

(65) Prior Publication Data

US 2012/0047197 A1 Feb. 23, 2012

Related U.S. Application Data

(63) Continuation of application No. 12/343,240, filed on Dec. 23, 2008, now Pat. No. 8,051,175, which is a continuation of application No. 09/852,963, filed on May 8, 2001, now Pat. No. 7,472,157.

(60) Provisional application No. 60/202,736, filed on May 8, 2000, provisional application No. 60/202,731, filed on May 8, 2000, provisional application No. 60/202,730, filed on May 8, 2000, provisional application No. 60/225,956, filed on Aug. 17, 2000, provisional application No. 60/230,341, filed on Sep. 6, 2000.

(51) Int. Cl.
*G06F 13/00* (2006.01)

(52) U.S. Cl. ............... 709/226; 709/202; 718/1

(58) Field of Classification Search .......... 709/201, 709/202, 204, 206, 217, 219, 223, 226; 718/1
See application file for complete search history.

(56) References Cited

U.S. PATENT DOCUMENTS

| | | | |
|---|---|---|---|
| 5,347,632 A | 9/1994 | Filepp et al. | |
| 5,491,784 A | 2/1996 | Douglas et al. | 715/810 |
| 5,557,518 A | 9/1996 | Rosen | |
| 5,590,038 A | 12/1996 | Pitroda | |
| 5,629,980 A | 5/1997 | Stefik et al. | |
| 5,734,823 A | 3/1998 | Saigh et al. | |
| 5,740,364 A | 4/1998 | Drerup | |
| 5,790,790 A | 8/1998 | Smith et al. | |
| 5,794,210 A | 8/1998 | Goldhaber et al. | |
| D399,836 S | 10/1998 | Wu et al. | |
| 5,838,790 A | 11/1998 | McAuliffe et al. | |
| 5,933,811 A | 8/1999 | Angles et al. | |
| 5,948,061 A | 9/1999 | Merriman et al. | |
| 5,955,961 A | 9/1999 | Wallerstein | 340/5.4 |
| 5,982,891 A | 11/1999 | Ginter et al. | |
| 6,049,807 A | 4/2000 | Carroll et al. | |

(Continued)

OTHER PUBLICATIONS

The Liberty Alliance Project, "Introduction to the Liberty Alliance Identity Architecture," Revision 1.0, Mar. 2003 edition, http://www.projectliberty.org (14 pgs.).

(Continued)

*Primary Examiner* — Viet Vu
(74) *Attorney, Agent, or Firm* — Jackson Walker L.L.P.; Christopher J. Rourk

(57) ABSTRACT

A method and system for providing enhanced intelligent agents that are moveable by a user from a browser application to a desktop. In specific embodiments, agents provide advanced interactive graphics and communications back to a server.

18 Claims, 20 Drawing Sheets

U.S. PATENT DOCUMENTS

| | | | |
|---|---|---|---|
| 6,061,448 | A | 5/2000 | Smith et al. |
| 6,061,695 | A | 5/2000 | Slivka et al. |
| 6,119,098 | A | 9/2000 | Guyot et al. |
| 6,119,137 | A | 9/2000 | Smith et al. |
| 6,119,229 | A | 9/2000 | Martinez et al. |
| 6,141,010 | A | 10/2000 | Hoyle |
| 6,151,675 | A | 11/2000 | Smith |
| 6,192,407 | B1 | 2/2001 | Smith et al. |
| 6,205,436 | B1 | 3/2001 | Rosen |
| 6,233,684 | B1 | 5/2001 | Stefik et al. |
| 6,236,971 | B1 | 5/2001 | Stefik et al. |
| 6,278,448 | B1 | 8/2001 | Brown et al. |
| 6,362,817 | B1 | 3/2002 | Powers et al. |
| 6,366,949 | B1 | 4/2002 | Hubert ............ 709/206 |
| 6,385,655 | B1 | 5/2002 | Smith et al. |
| 6,401,134 | B1 * | 6/2002 | Razavi et al. ............ 719/310 |
| 6,430,568 | B1 | 8/2002 | Hickey et al. ............ 1/1 |
| 6,437,803 | B1 | 8/2002 | Panasyuk et al. |
| 6,450,407 | B1 | 9/2002 | Freeman et al. ............ 235/492 |
| 6,470,086 | B1 | 10/2002 | Smith |
| 6,487,599 | B1 | 11/2002 | Smith et al. |
| 6,490,601 | B1 | 12/2002 | Markus et al. |
| 6,499,036 | B1 | 12/2002 | Gurevich |
| 6,502,191 | B1 | 12/2002 | Smith et al. |
| 6,516,411 | B2 | 2/2003 | Smith |
| 6,529,956 | B1 | 3/2003 | Smith et al. |
| 6,546,554 | B1 | 4/2003 | Schmidt et al. |
| 6,609,196 | B1 | 8/2003 | Dickinson, III et al. |
| 6,609,658 | B1 | 8/2003 | Sehr ............ 235/384 |
| 6,615,190 | B1 | 9/2003 | Slater ............ 705/41 |
| 6,636,247 | B1 | 10/2003 | Hamzy et al. |
| 6,640,304 | B2 | 10/2003 | Ginter et al. |
| 6,647,370 | B1 | 11/2003 | Fu et al. |
| 6,651,166 | B1 | 11/2003 | Smith et al. |
| 6,662,163 | B1 | 12/2003 | Albayrak et al. ............ 704/275 |
| 6,687,745 | B1 | 2/2004 | Franco et al. |
| 6,745,382 | B1 | 6/2004 | Zothner |
| 6,757,712 | B1 | 6/2004 | Bastian et al. |
| 6,847,364 | B1 | 1/2005 | Dichter |
| 6,907,452 | B1 * | 6/2005 | Malik ............ 709/206 |
| 6,928,623 | B1 | 8/2005 | Sibert |
| 7,243,130 | B2 | 7/2007 | Horvitz et al. |
| 7,251,696 | B1 | 7/2007 | Horvitz |
| 7,266,595 | B1 | 9/2007 | Black et al. |
| 7,272,625 | B1 | 9/2007 | Hannel et al. |
| 7,299,493 | B1 | 11/2007 | Burch et al. |
| 7,330,895 | B1 | 2/2008 | Horvitz |
| 7,380,120 | B1 | 5/2008 | Garcia |
| 2001/0030667 | A1 | 10/2001 | Kelts |
| 2002/0040314 | A1 | 4/2002 | Tolson |
| 2002/0077803 | A1 | 6/2002 | Kudoh et al. |
| 2002/0103811 | A1 | 8/2002 | Fankhauser et al. |
| 2002/0120673 | A1 | 8/2002 | Tolson et al. |
| 2002/0129092 | A1 | 9/2002 | Tolson et al. |
| 2002/0174010 | A1 | 11/2002 | Rice |
| 2003/0005464 | A1 | 1/2003 | Gropper et al. |
| 2003/0016247 | A1 | 1/2003 | Lai et al. |
| 2003/0033402 | A1 | 2/2003 | Battat et al. |
| 2003/0038798 | A1 | 2/2003 | Besl et al. |
| 2003/0061463 | A1 | 3/2003 | Tibbetts |
| 2003/0105721 | A1 | 6/2003 | Ginter et al. |
| 2004/0119759 | A1 | 6/2004 | Barros |
| 2004/0193606 | A1 | 9/2004 | Aria et al. |
| 2004/0215650 | A1 | 10/2004 | Shaji et al. |
| 2005/0086326 | A1 | 4/2005 | Manning et al. |
| 2006/0059544 | A1 | 3/2006 | Guthrie et al. |
| 2006/0095779 | A9 | 5/2006 | Bhat et al. |
| 2006/0206573 | A1 | 9/2006 | Horvitz et al. |
| 2006/0218402 | A1 | 9/2006 | Kerstens et al. |

OTHER PUBLICATIONS

Time and Data.com—The World Clock—Time Zones—http://www.timeanddate.com/worldclock; Copyright Steffen Thorsen 1995-2005 (3 pgs.).

"PC Update Online" An introduction to Object Resource Brokers: http://www.melbpc.org.au/pcupdate/9610/9610article7.htm; pp. 1 of 4 to 4 of 4.

OMG, Object Management Group; ORB BAsics: wysiwyg://28/http://www.omg.org/gettingstarted/orb_basics.htm; pp. 1 of 8 to 8 of 8.

OMG, Object Management Group: Corba Basics; Corba FAQ; wysiwyg://26/http://www.omg.org/gettingstarted/corbafaq.htm; pp. 1 of 6 to 6 of 6.

OMG, Object Management Group: Introduction to OMG's Specifications: wysiwyg://11/http://www.omg.org/gettingstarted/specintro.htm; pp. 1 of 5 to 5 of 5.

Time and Data.com—The World Clock—Time Zones—http://www.timeanddate.com/worldclock/: Copyright Steffen Thorsen 1995-2005 (3 pgs.).

"PC Update Online," An Introduction to Object Resource Brokers; http://melbpc.org.au/pcupdate/9610/9610article7.htm; pp. 1 of 4 to 4 of 4, Oct. 1996.

OMG, Object Management Goup; ORB Basics; wysiwyg://28/http://omg.org/gettingstarted/orb_basics.htm; pp. 1 of 8 to 8 of 8, Apr. 13, 2001.

OMG, Object Management Group; Corba Basics; Corba FAQ; wysiwyg://26/http://omg.org/gettingstarted/corbafaq.htm; pp. 1 of 6 to 6 of 6; May 2, 2001.

OMG, Object Management Group: Introduction to OMG's Specifications: wysiwyg://11/http://omg.org/gettingstarted/specintro.htm; pp. 1 of 5 to 5 of 5, May 2, 2001.

Search Report for PCT/US001/028150, mailed Dec. 14, 2001, 5 pgs.

* cited by examiner

A

B

C

D

E

F

G

H

US 8,291,082 B2

ARCHITECTURE FOR A SYSTEM OF PORTABLE INFORMATION AGENTS

CROSS REFERENCE TO RELATED APPLICATIONS

This application claims benefit of priority from provisional patent application No. 60/202,736 filed May 8, 2000, incorporated herein by reference.

This application claims benefit of priority from provisional patent application No. 60/202,731 filed May 8, 2000, incorporated herein by reference.

This application claims benefit of priority from provisional patent application No. 60/202,730 filed May 8, 2000, incorporated herein by reference.

This application claims benefit of priority from provisional patent application No. 60/225,956 filed Aug. 17, 2000, incorporated herein by reference.

This application claims benefit of priority from provisional patent application No. 60/230,341 filed Sep. 6, 2000, incorporated herein by reference.

This application is a continuation application of U.S. Ser. No. 09/852,963, filed May 8, 2001 and entitled "Architecture for a System of Portable Information Agents," and is incorporated herein by reference. This application is also related to U.S. patent application Ser. No. 10/381,524, filed Aug. 25, 2003, entitled "Method and Apparatus for a Portable Information Account Access Agent"; and U.S. patent application Ser. No. 09/852,979, filed May 8, 2001, entitled "Method and System for Business Application of a Portable Information Agent"; and U.S. patent application Ser. No. 09/852,971, filed May 8, 2001, entitled "Method and Apparatus for a Portable Information Agent"; and U.S. patent application Ser. No. 09/954,724, filed Sep. 12, 2001, entitled "Method and Apparatus for a Distributable Globe Graphical Object"; and U.S. patent application Ser. No. 10/943,495, filed Sep. 17, 2004, entitled "Distributed Secure Respository": and U.S. patent application Ser. No. 10/944,440, filed Sep. 17, 2004, entitled "Relationship-Managed Communication Channels"; and U.S. patent application Ser. No. 10/944,441, filed Sep. 17, 2004, entitled "Policy Managed Objects."

The present application is a continuation of Ser. No. 12/343,240, filed Dec. 23, 2008, now U.S. Pat. No. 8,051,175, issued Nov. 1, 2011, entitled "ARCHITECTURE FOR A SYSTEM OF PORTABLE INFORMATION AGENTS" and Ser. No. 09/852,963, filed May 8, 2001, now U.S. Pat. No. 7,472,157, issued Dec. 30, 2008, entitled "ARCHITECTURE FOR A SYSTEM OF PORTABLE INFORMATION AGENTS," which are hereby incorporated by reference for all purposes.

COPYRIGHT NOTICE

Pursuant to 37 C.F.R. 1.71(e), applicant notes that a portion of this disclosure contains material that is subject to copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to the field of information and/or data handling methods and systems. In specific embodiments, the present invention involves methods and/or systems directed to providing distributable active content that can exist in a variety of software environments.

BACKGROUND OF THE INVENTION

Familiarity with information and data handling methods and techniques is characteristic of practitioners in the art and is presumed of the reader. At the present time, many people are familiar with accessing information over a data network. The WWW is a public data network that is becoming increasingly used for accessing multi-media information. This information can be one-way, passively experienced information, or mo-way information including two-way text, audio, or video data.

At the present time, there is a desire to enrich the user experience. One particular aspect of typical WWW interactions is that interactions take place within the confines of an application, such as a browser. In order to access the information, a user must be at a computer system with a particular type of application for user access. Generally, an interactive application is limited to a particular platform, such as a particular operating system or information handling device.

The Internet comprises computers and computer networks that are interconnected through communication links. The interconnected computers exchange information using various services, such as electronic mail, ftp, the World Wide Web ("WWW"), and other services including secure services. The WWW service can be understood as allowing a server computer system (e.g., a Web server or a Web site) to send Web pages of information to a remote client computer system. The remote client computer system can then display the Web pages. Generally, each resource (e.g., computer or Web page) of the WWW is uniquely identifiable by a Uniform Resource Locator ("URL"). To view a specific Web page, a client computer system specifies the URL for that Web page in a request. The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using a Hyper Text Markup Language ("HTML") or similar language. HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to providing information services over the internet. Services can include items (e.g., music or stock quotes) that are delivered electronically to a purchaser over the Internet. Services can also include handling orders for items (e.g., groceries, books, or chemical or biologic compounds, etc.) that may be delivered through conventional distribution channels (e.g., a common carrier). Services may also include handling orders for items, such as airline or theater reservations, that a purchaser accesses at a later time. A server computer system may provide an electronic version of an interface that lists items or services that are available.

SUMMARY

The present invention, in various aspects, involves a method and/or system and/or apparatus for providing an enhanced user interaction in an information processing environment. In various specific embodiments, aspects of the invention enable the presentation to users of a portable information agent (PIA) (at times, referred to herein as an Envoii™) which can provide enhanced user interactions with graphical objects. Particular aspects of the invention further comprise systems, components, and/or methods allowing an agent to be portable over different platforms.

In the present discussion, information available over a public network may be referred to as contained in documents or presentations or compositions. It should be understood that the terms information or document refer to any type of digitally-encoded data that can be presented or transmitted by a computer or other digital device including, but not limited to, text, graphics, photos, executable files, data tables, audio, video, three dimensional data, or multimedia data that is a combination of any of these.

In a further embodiment, the invention comprises a new method for allowing an agent supplier to enhance and track user interaction with an agent and for communicating information between an agent supplier and an agent. In a further embodiment, the invention comprises a new method for allowing an agent to be moved from a browser application to a desktop or to another platform. In a further embodiment, the invention comprises a new method for tracking and reporting back user interactions with an enhanced agent. In a further embodiment, the invention involves a new method and system allowing an agent to move from an initial application to a new location without requiring specific user input. In a further embodiment, the invention involves a new method and system allowing composeability of PIA (or Envoii) objects, by allowing a one Envoii agent to be connected to another Envoii agent, thereby providing additional functions.

In further embodiments, the present invention may be understood in the context of user systems in communication with external data systems over a communication media. An important application for the present invention, and an independent embodiment, is in the field of providing a persistent object that can be initially accessed through a browser and that can move to other software platforms, such as other programs, a desktop, or other devices. In particular embodiments, services according to specific embodiments of the invention can be accessed using an agent over the Internet, optionally using Internet media protocols and formats, such as HTTP, RTTP, XML, HTML, dHTML, VRML, as well as image, audio, or video formats etc. However, using the teachings provided herein, it will be understood by those of skill in the art that the methods and apparatus of the present invention could be advantageously used in other related situations where it is desirable to have a persistent agent.

The invention and various specific aspects and embodiments will be better understood with reference to the following drawings and detailed descriptions. In different figures, similarly numbered items are intended to represent similar functions within the scope of the teachings provided herein. In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims. Furthermore, it is well known in the art of internet applications and software systems that particular file formats, languages, and underlying methods of operation may vary. The disclosure of a particular implementation language or format of an element should not be taken to limit the invention to that particular implementation unless so provided in the attached claims. The invention will be better understood with reference to the following drawings and detailed description.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative or example embodiment in this specification. The functional aspects of the invention that are implemented on a computer, as will be understood from the teachings herein, may be implemented or accomplished using any appropriate implementation environment or programming language, such as C, C++, Pascal, Java, Java-script, HTML, XML, dHTML, assembly or machine code programming, etc. Source code examples used herein are given for example purposes. It will be understood to those of ordinary skill in the art that many different source code examples could be used to implement aspects of the invention. All references, publications, patents, and patent applications cited herein are hereby incorporated by reference in their entirety for all purposes.

BRIEF DESCRIPTION OF THE DRAWINGS [I]

Figure 22:
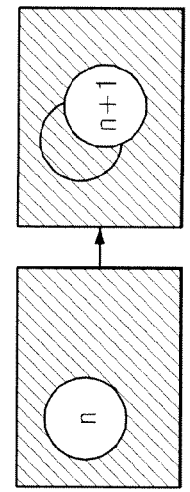

FIG. 22 and following figures illustrate an example Desktop Refreshing Algorithm according to specific embodiments of the present invention, with FIG. 22 illustrating the initial move of an example sphere Envoii.

Figure 23:
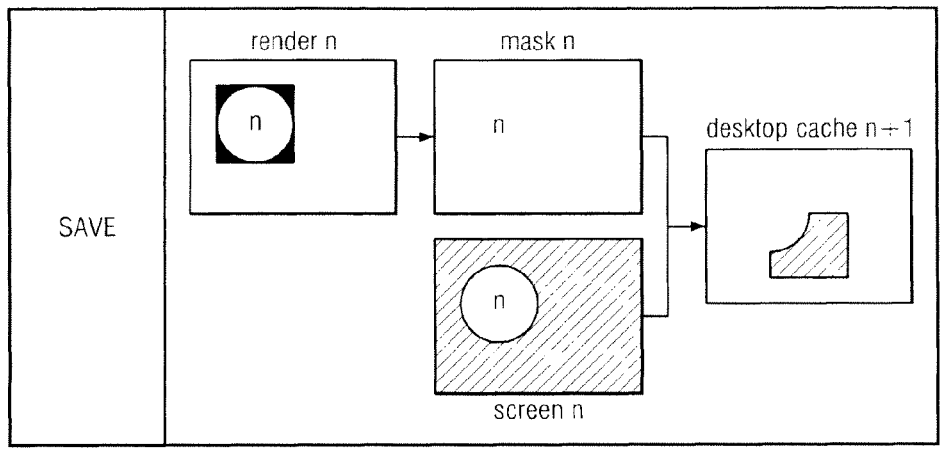

FIG. 23 illustrates render, mask, and save steps of an example Desktop Refreshing Algorithm according to specific embodiments of the present invention.

Figure 24:
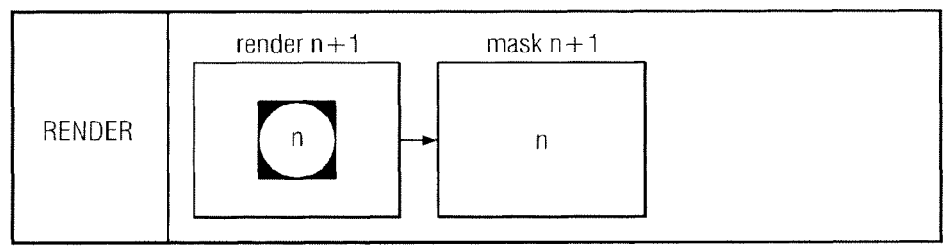

FIG. 24 illustrates render and mask steps of an example Desktop Refreshing Algorithm according to specific embodiments of the present invention.

Figure 25:
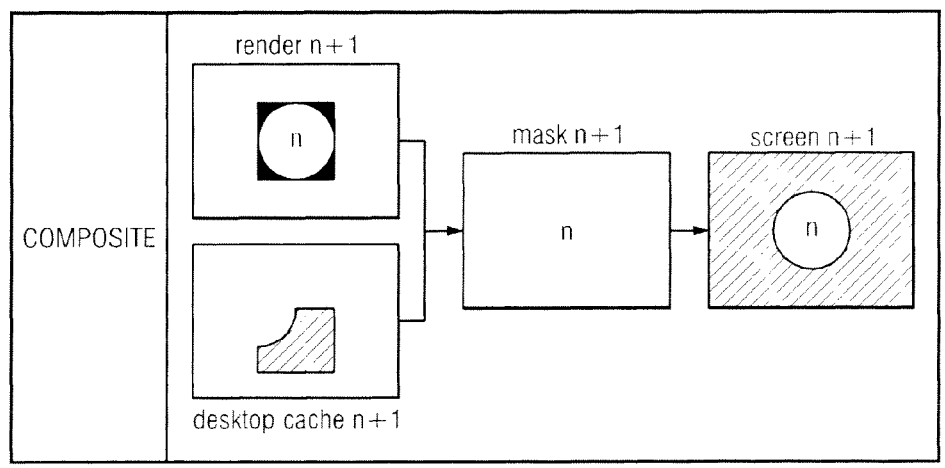

FIG. 25 illustrates concluding steps of an example Desktop Refreshing Algorithm according to specific embodiments of the present invention.

Figure 26:
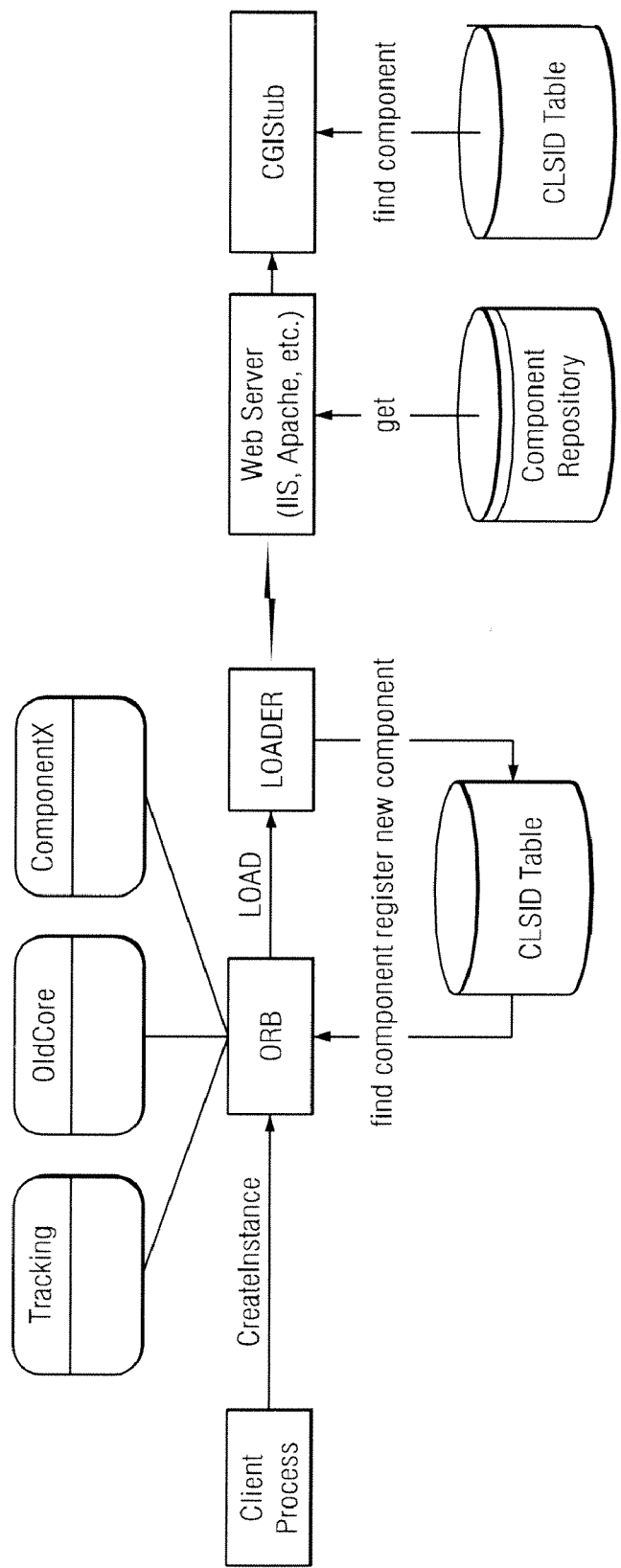

FIG. 26 is a block diagram illustrating operation of an Object Request Broker (ORB) during a create instance according to specific embodiments of the invention.

Figure 27:
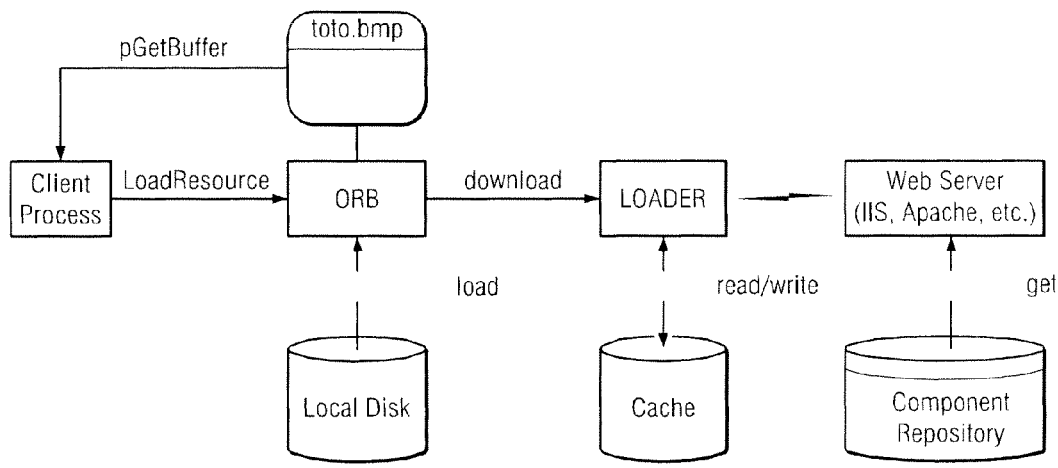

FIG. 27 is a block diagram illustrating the operation of a load resource according to specific embodiments of the invention.

Figure 28:
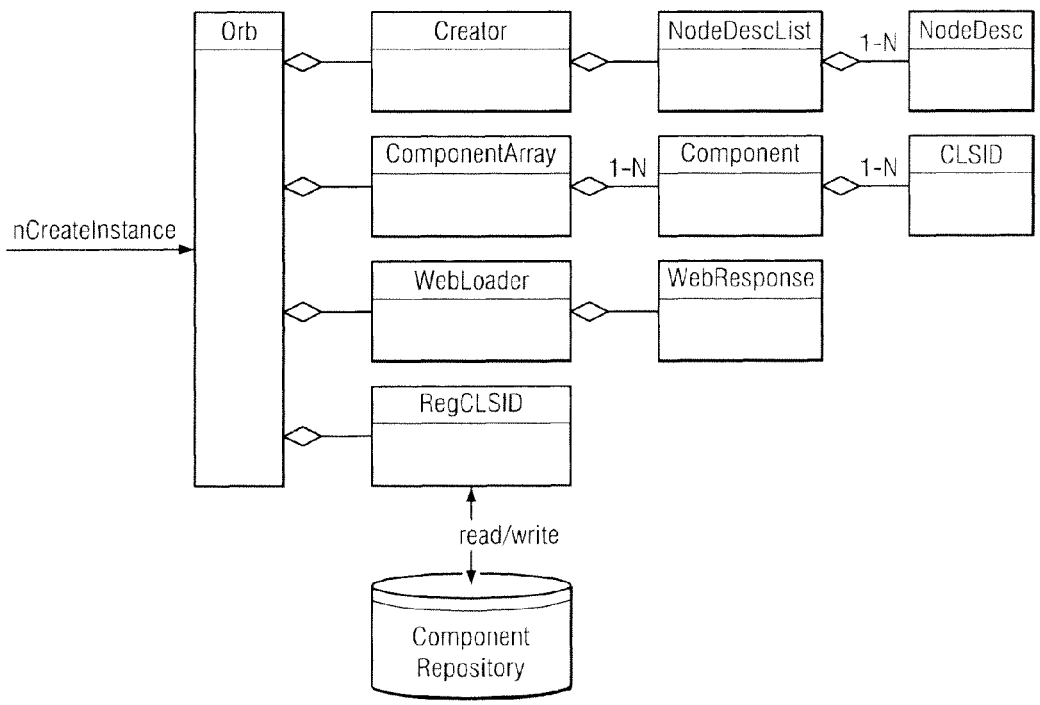

FIG. 28 is a block diagram illustrating a Unified Modeling Language (UML) description for an ORB according to specific embodiments of the invention.

Figure 29:
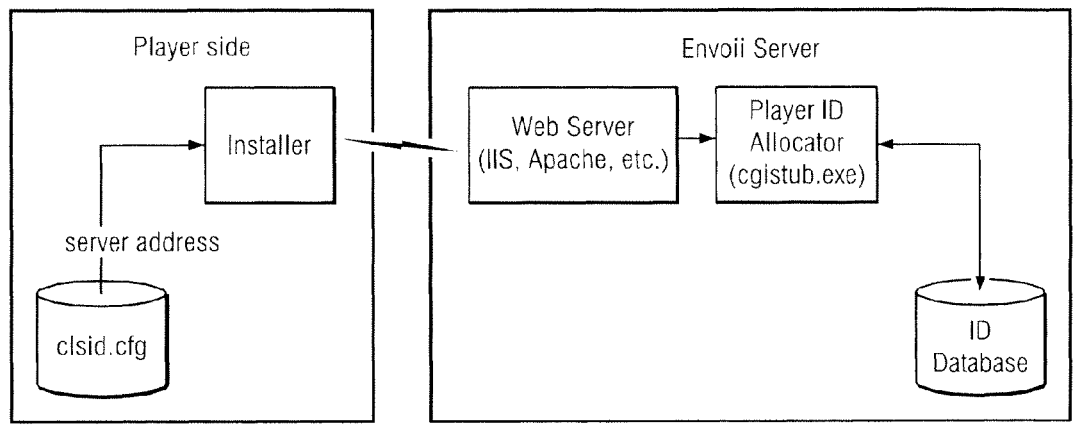

FIG. 29 is a block diagram illustrating assignment of a Player ID from a server according to specific embodiments of the invention.

Figure 30:
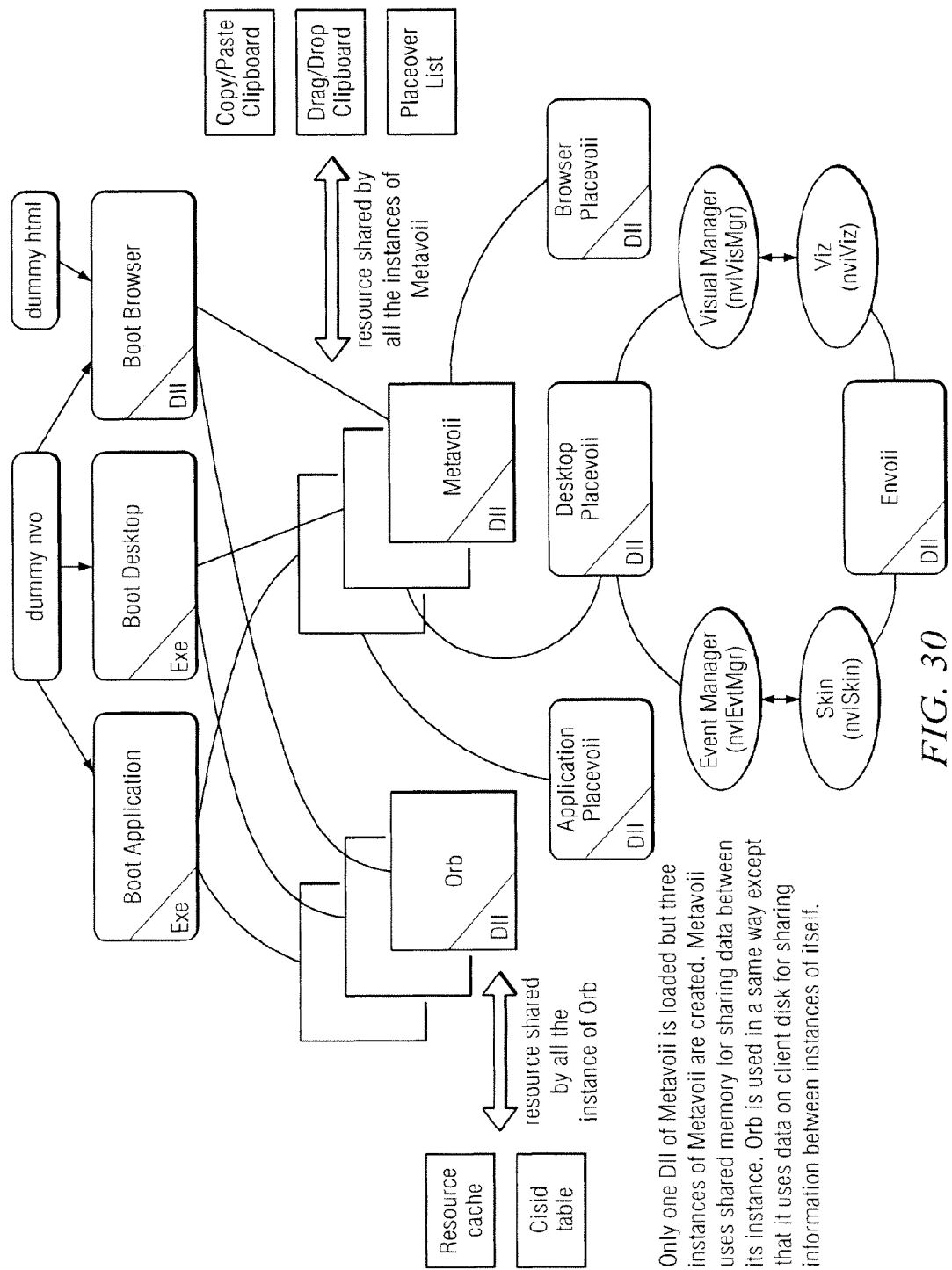

FIG. 30 is a block diagram illustrating atop level software architecture at a client machine according to specific alternative embodiments of the invention.

Figure 31:
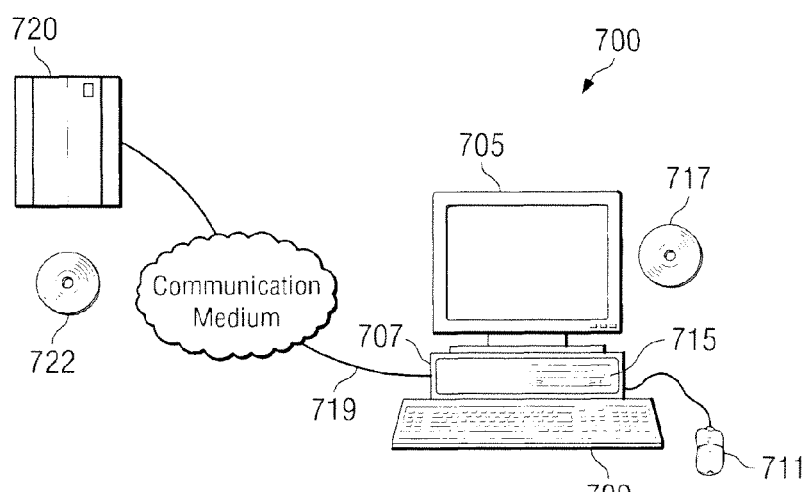

FIG. 31 is a block diagram showing a representative example logic device in which various aspects of the present invention may be embodied.

DESCRIPTION OF SPECIFIC EMBODIMENTS

According to specific embodiments, the present invention extends and transforms user interactions over the internet by providing portable information agents (PIAS) that can be initially accessed in a first interface or window (such as an HTML browser window or an email message window), but that can move or be moved to another software location, such as a desktop. Once moved to another location, a PIA according to specific embodiments of the present invention, maintains for the most part the functionality and connections that it had in the initial location.

1. User Interaction Methods and Operation

According to specific embodiments, the present invention can be understood with regards to a user's experience interacting with a PIA. This discussion will therefore begin with the user interaction, which contains many novel elements. Following this discussion is given particular examples of implementation details according to specific embodiments of the invention. Many of these details will not be visible to the user and it will be understood from the teachings herein that other implementations are possible within the scope of the invention.

Figure 1:
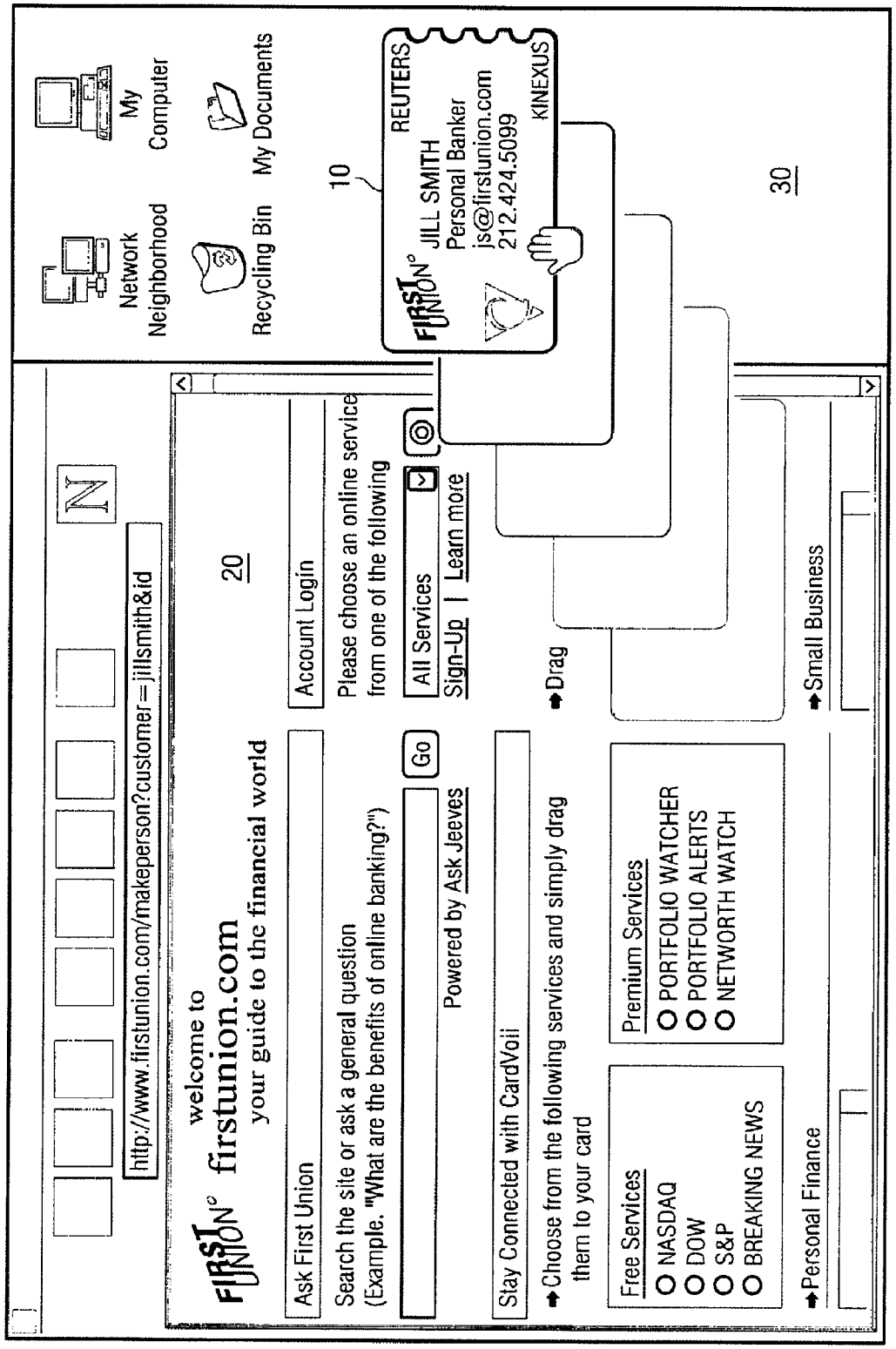
FIG. 1 illustrates an example graphical display showing a method of moving an Envoii PIA from a browser window to a desktop according to specific embodiments of the invention.

FIG. 1 illustrates an example graphical display showing a method of moving an Envoii PIA from a browser window to a desktop according to specific embodiments of the invention. As shown in the figure, an Envoii 10 (in this case displayed as a business card of a bank representative Jill Smith) can be dragged from its initial location 20, which in this example is within a browser window, and can be moved to a new location 30, which in this example is on a desktop, such as a Windows Operating System desktop.

As will be further understood from the discussion below, the technology according to specific embodiments of the invention allows active content to be brought to the desktop without application installations. Envoiis can be dragged from the browser to the desktop or to any Envoii-enabled place. Envoiis can pull data from external sources in response to a user's actions or can be designed to move to a new location without requiring user action.

Figure 2:
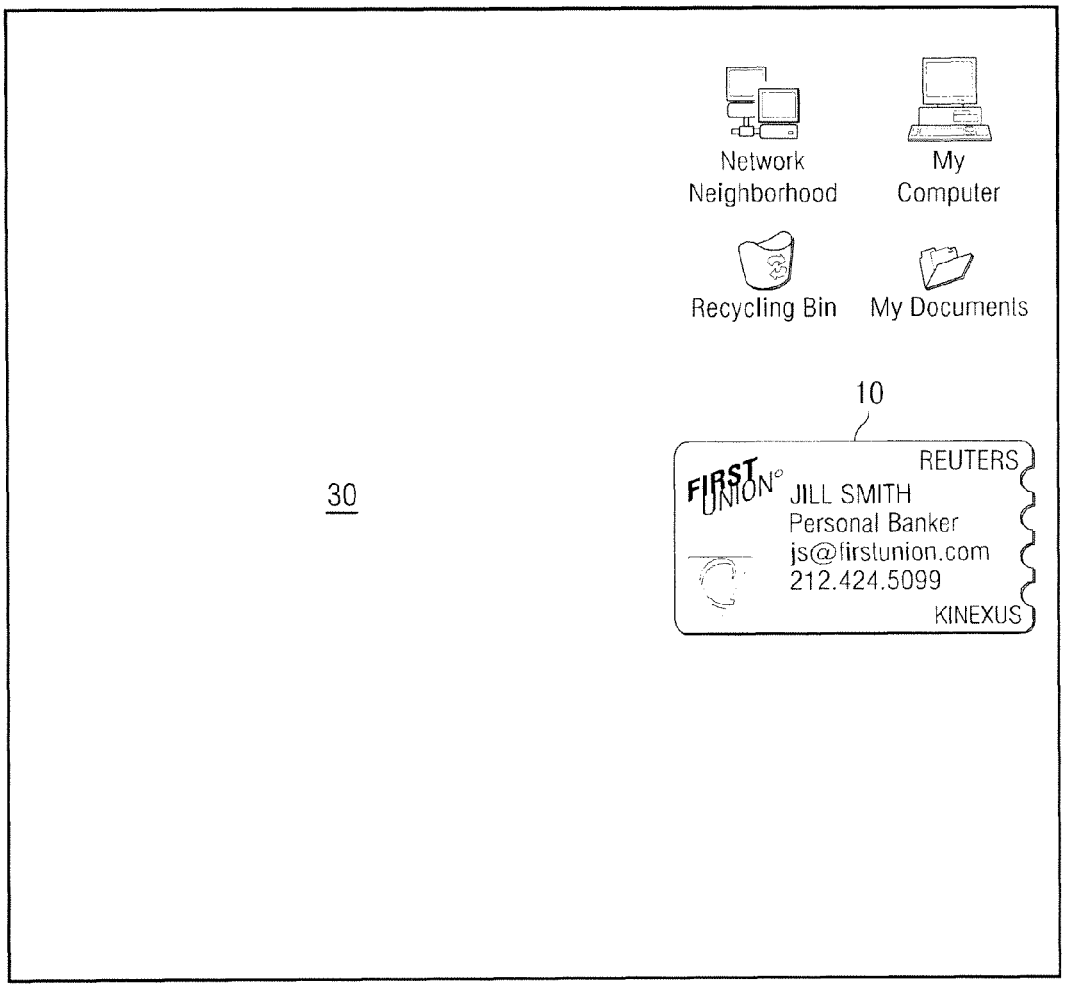
FIG. 2 illustrates an example graphical display showing an Envoii PIA residing on a desktop after closing a browser window and illustrating that an Envoii PIA has a sustained connection, so that when a client restarts a machine, an Envoii can remain on the desktop where the user left it, according to specific embodiments of the invention.

FIG. 2 illustrates an example graphical display showing an Envoii PIA residing on a desktop after closing a browser window and illustrating that an Envoii PIA has a sustained connection, so that when a client restarts a machine, an Envoii can remain on the desktop where the user left it, according to specific embodiments of the invention. According to specific embodiments of the invention. Envoiis can exist independent of the browser and other applications and can freely travel from place to place and the experiences and functionalities found within Envoiis migrate from place to place without fragmentation. Thus, in this example, when Jill's clients restart their machines, her card appears on their desktops, just as they left it. The Envoiis, according to specific embodiments of an enabling system as described herein, can contain lightweight, rich graphics and interactive effects and can also contain functionality or links to external functions. In further embodiments, Envoiis have the ability to wrap third-party content, such as Flash, 3d files, video formats and audio.

Figure 3:
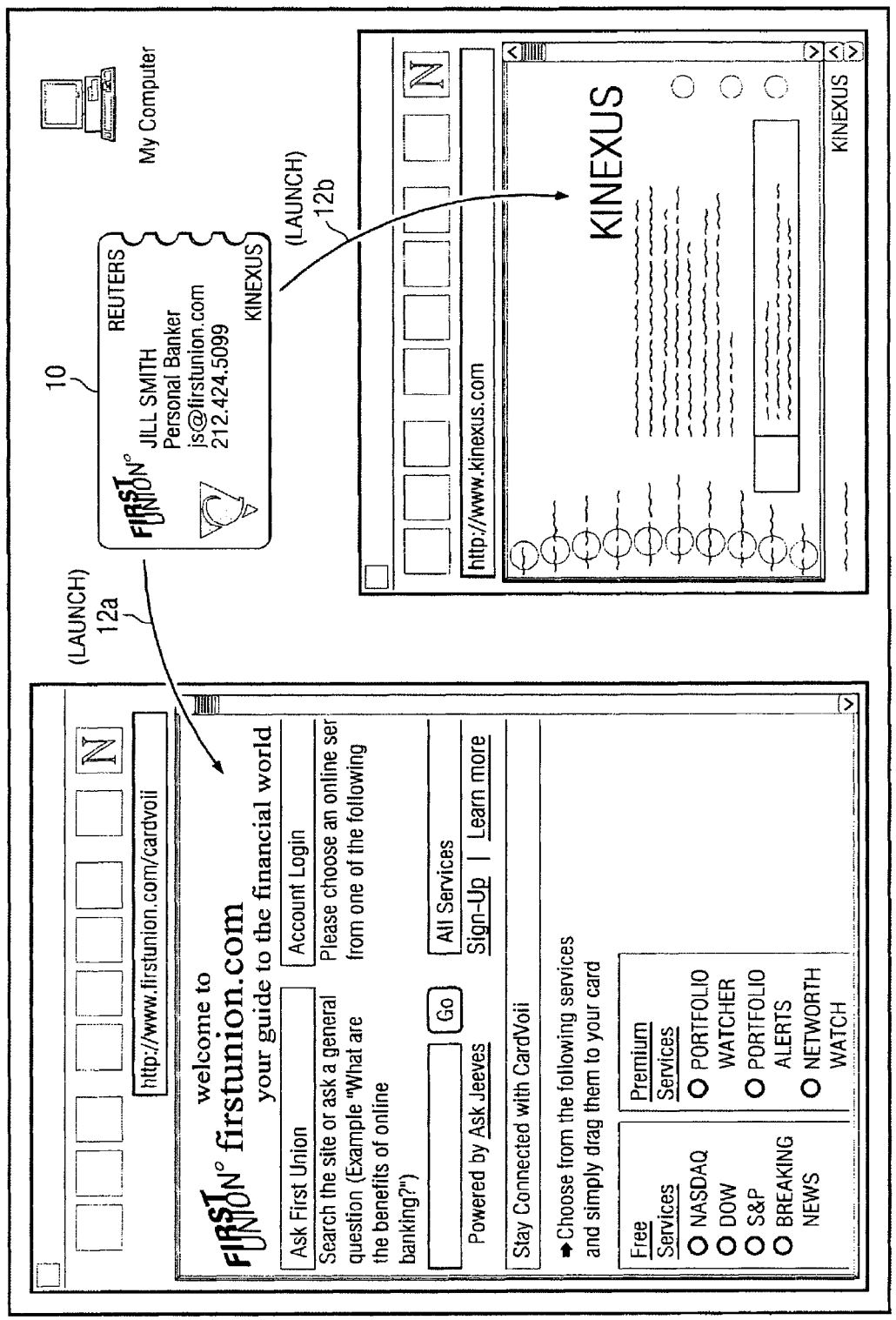
FIG. 3 illustrates an example graphical display showing an Envoii PIA providing active links to two different URLs through launched browser windows according to specific embodiments of the invention.

FIG. 3 illustrates an example graphical display showing an Envoii PIA providing active links to two different URLs through launched browser windows according to specific embodiments of the invention. In this example, on example PIA 10 are two links 12a and 12b that allow selection to URL locations.

Figure 4:
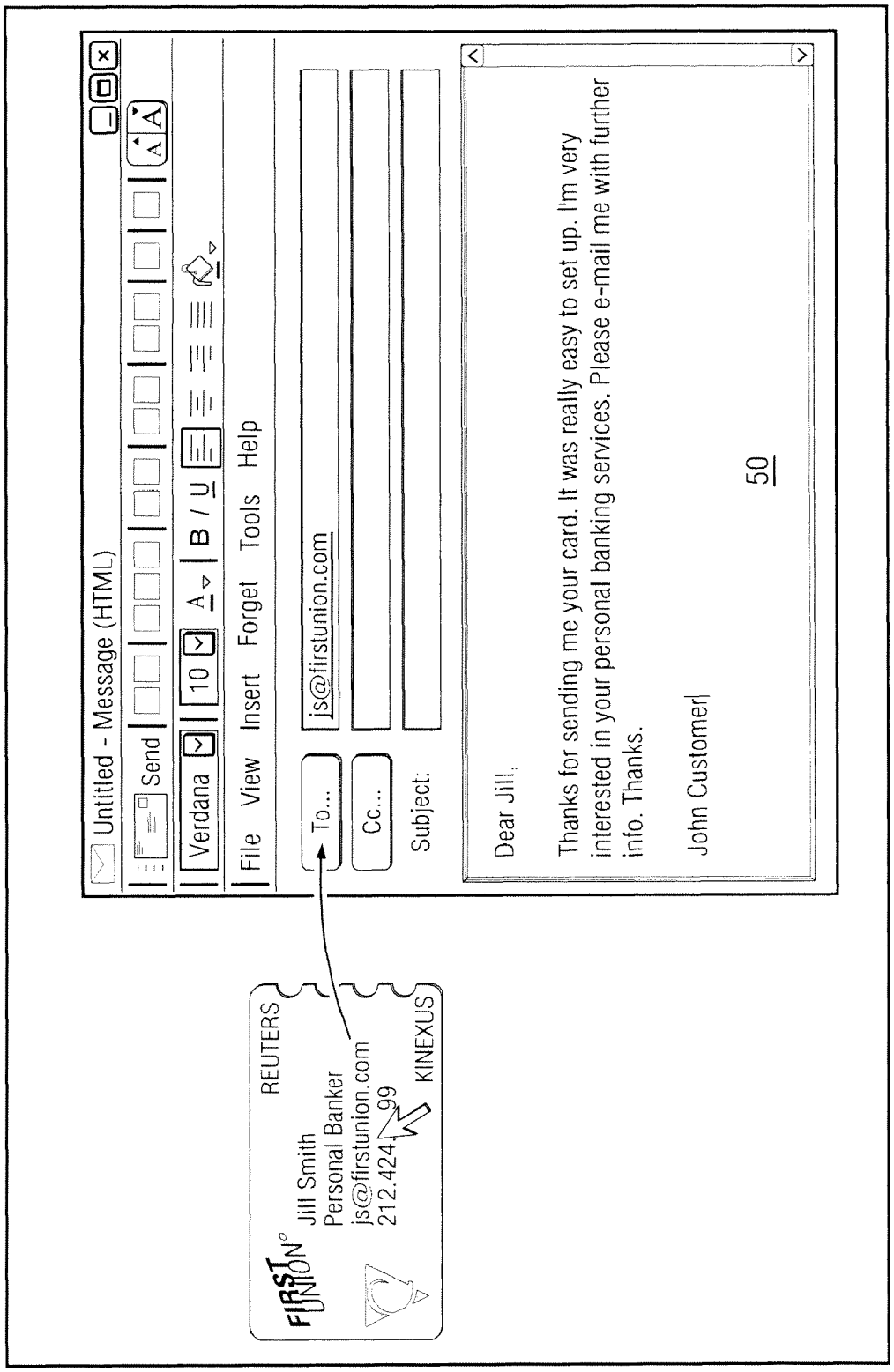
FIG. 4 illustrates an example graphical display showing an Envoii PIA activating an associated function, such as an email sending program, according to specific embodiments of the invention.

FIG. 4 illustrates an example graphical display showing an Envoii PIA activating an associated function, such as an email sending program, according to specific embodiments of the invention. In particular embodiments, virtually any application can be launched from an Envoii. Thus, Envoiis can extend a client's brand (such as, in this example, First Union Bank) to many platforms and environments and provide links to their services. In this embodiment, with two-way communications, Jill can remain in touch with clients and contacts at all times. The Envoii can launch an email client 50 for sending and receiving emails. While these figures show an Envoii initially distributed from a browser window. Envoiis can also be distributed via email.

Figure 5:
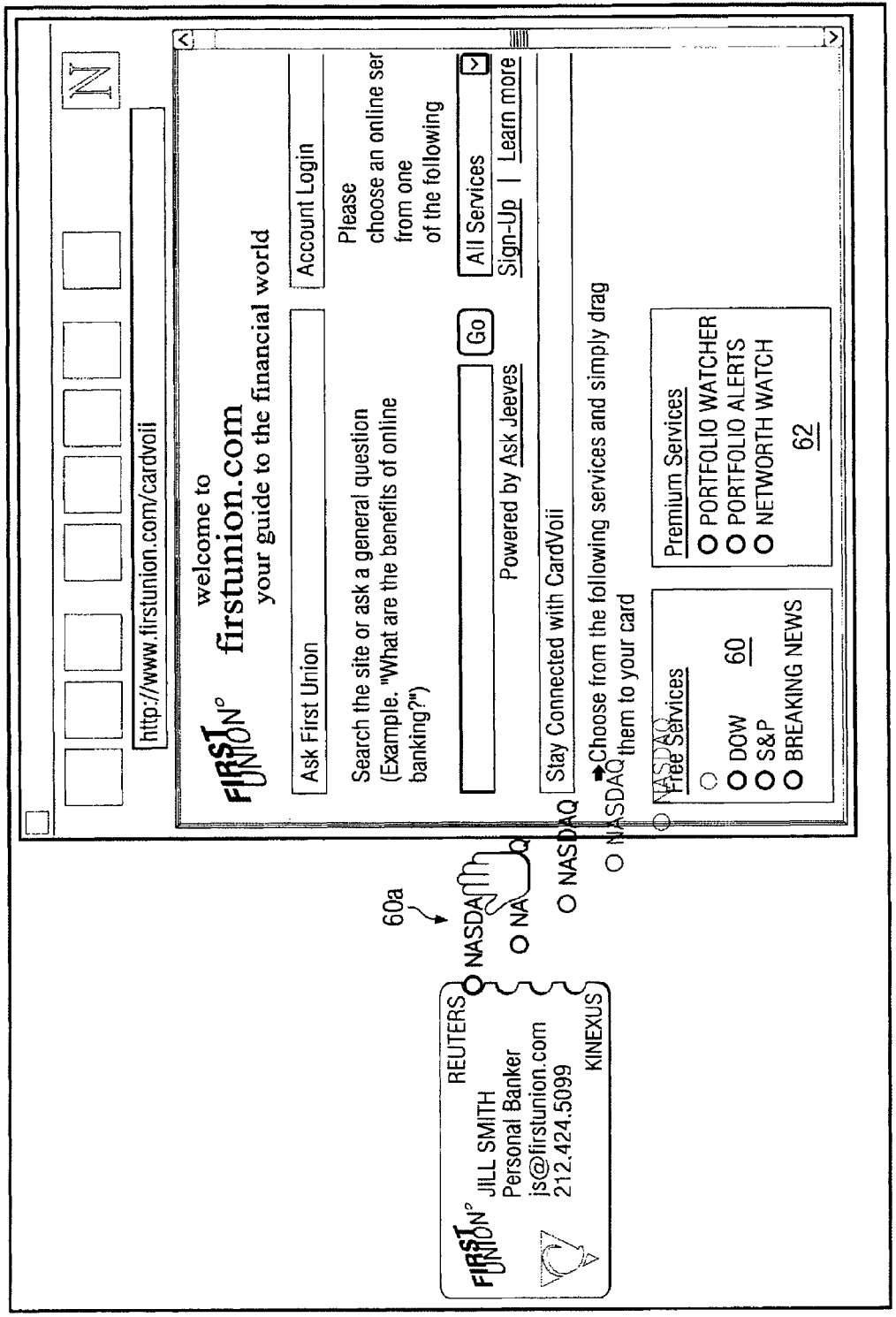
FIG. 5 illustrates an example graphical display showing an Envoii PIA being associated with a composable function according to specific embodiments of the invention.

FIG. 5 illustrates an example graphical display showing an Envoii PIA being associated with a composable function according to specific embodiments of the invention. Thus, according to specific embodiments of the invention. Envoiis can become part of another Envoii and users can personalize their experience, configuring services as needed. Businesses can easily add or update services provided to Envoiis. An authoring environment, according to specific embodiments of the invention, allows new Envoiis to be "snapped together" for easy expandability. As shown in the figure, a user can select from a group of free services Envoiis 60 or premium service Envoiis 62. In this example, these Envoiis are represented as dots (such as 60a) with text indicating a service. When dragged to an appropriate Envoii PIA, the dots graphically snap into slots or groove on the business card Envoii 10. Once snapped in, the service Envoiis remain associated with the business card Envoii and is activated along with the business card Envoii.

Figure 6:
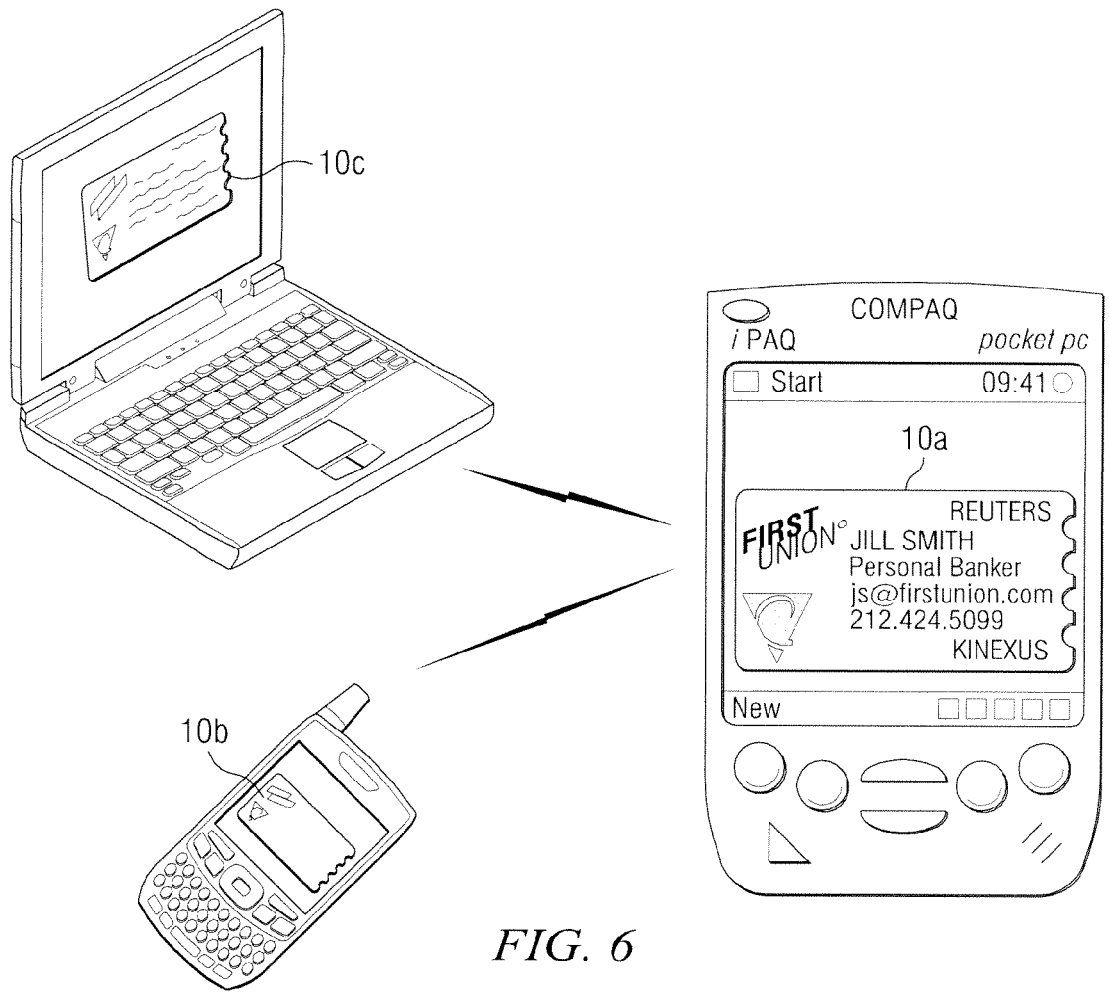
FIG. 6 illustrates an example graphical display showing an Envoii PIA moved to multiple information devices according to specific embodiments of the invention.

FIG. 6 illustrates an example graphical display showing an Envoii PIA moved to multiple information devices according to specific embodiments of the invention. According to specific embodiments of the invention, Envoiis run on the most popular operating systems and can migrate seamlessly from platform to platform. Thus, content created in the Envoii authoring environment is targeted to live on any platform.

Figure 7:
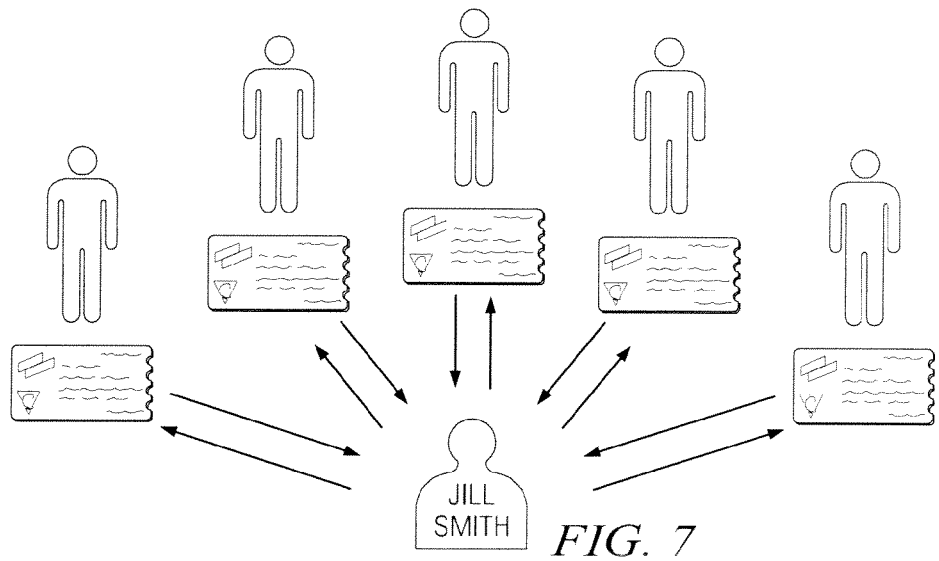
FIG. 7 illustrates an example business method according to specific embodiments of the invention wherein a services provider can keep in touch with multiple customers using an Envoii PIA.

FIG. 7 illustrates an example business method according to specific embodiments of the invention wherein a services provider can keep in touch with multiple customers using an Envoii PIA. According to specific embodiments of the invention, the invention allows Multicast and Peer to Peer communications. Persistent connections can be established between any two Envoiis wherever they are. Connections between Envoiis can be used for Instant Messaging, data exchange, file sharing and collaborations. For example, in this case Jill's clients might be able to share stock tips with one another. In addition, A=an example of a simple composition with a metavoii and two places, with a very few non-structural connections indicated as dotted arrows. It is clear from this example the importance of the ability to track and manage connections; B=that in this model, the parent of a Metavoii can become Envoii.com; C=this (100) is what we have been calling a "Metavoii." It has several services attached as parts: Tracking, Communications, ORB and security; D=this (110) is an example of a "placevoii." It has an event server and Display Manager attached, but is empty. To the left is another placevoii with three children; E=in this sub-composition Envoii (120c) there are two skins attached one of which is a tracking skin and is connected to the tracking manager and one which is setting properties on a viz.

The present invention has thus far been described in terms of general methods and devices. The previous description is a full and complete description sufficient to allow an ordinary practitioner in the art to make and use the invention as described. It will be understood to those of skill in the art from the teachings provided herein that the described invention can be implemented in a wide variety of specific programming environments and logical systems (such as UNIX, Windows, Solaris, Oracle, etc.) using a wide variety of programming languages (such as SQL, Visual Basic, Pascal, C++, Basic, Java, etc.) and wide variety of file formats.

What follows are descriptions of example systems and methods that embody various aspects of the present invention and that describe further novel aspects of particular embodiments. The following discussion is included, in part, in order to disclose particularly preferred modes presently contemplated for practicing the invention. It is intended, however, that the previous discussion and the claims not be limited by the examples that follow. It is further intended that the attached claims be read broadly in light of the teachings provided herein. Where specific examples are described in detail, no inference should be drawn to exclude other known examples or examples described briefly from the broad description of the invention or the language of the claims. It is therefore intended that the invention not be limited except as provided in the attached claims and equivalents thereof.

2. Architecture Enabling Envoiis According to Specific Embodiments of the Invention In further embodiments, the invention comprises a distributed component architecture that facilitates methods discussed above. From the teachings provided herein, it will be understood that this is one example architecture and that other architectures according to specific embodiments of the invention as previously described, are possible. This architecture can be understood as based on an aggregation model as opposed to an inheritance model. The design offers maximum flexibility and adaptability to environments that cannot always be predicted, without placing undue constraints on what is possible.

Figure 8:
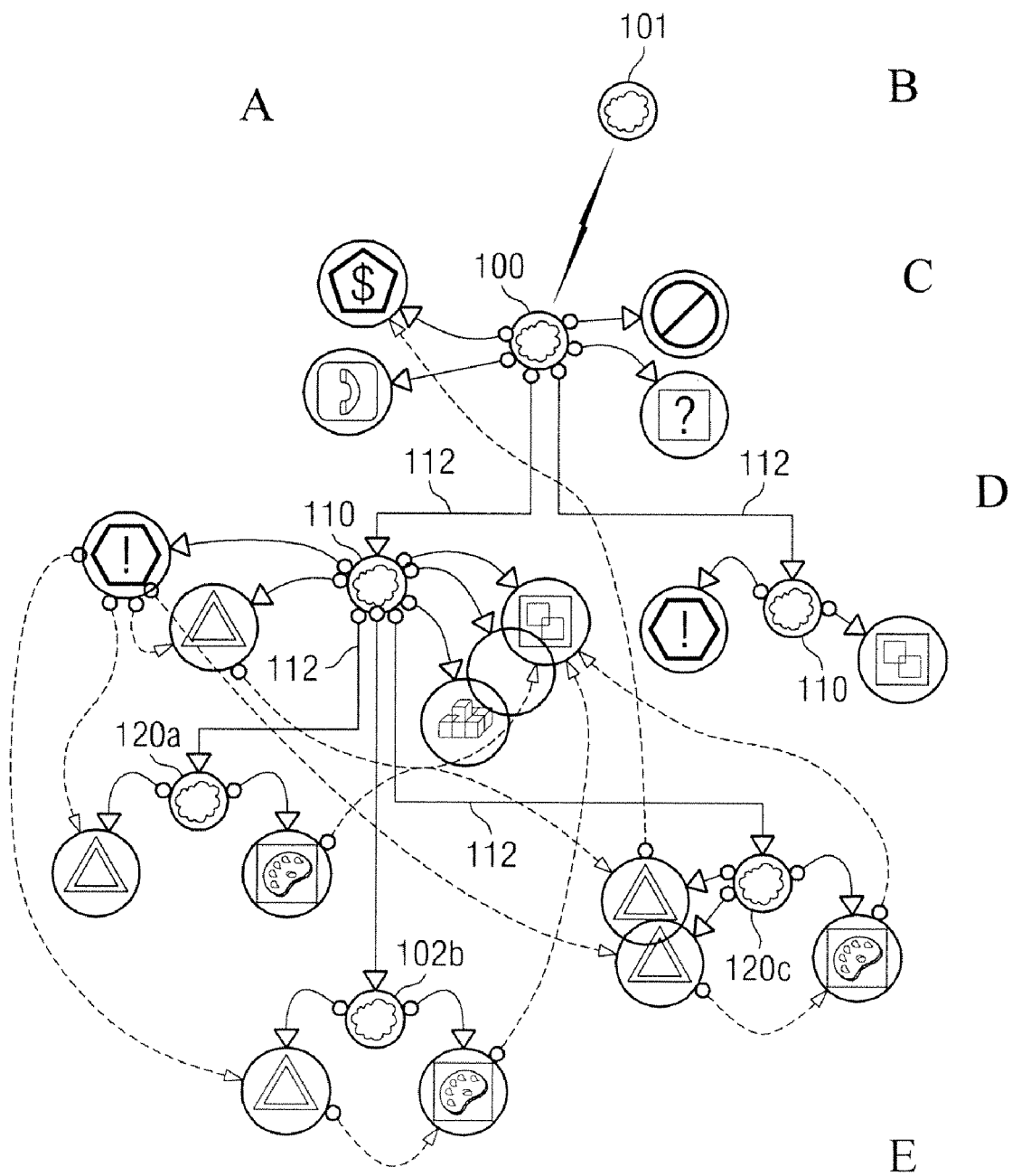
FIG. 8 illustrates an architecture of a component oriented system according to specific embodiments of the invention.
Figure 9:
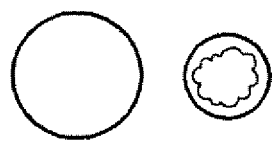
FIG. 9 is a diagram providing additional details regarding the architecture shown in FIG. 5.
Figure 9:
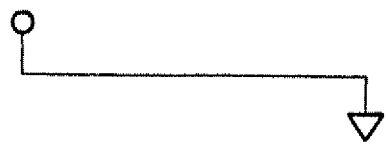
Figure 9:
Figure 9:
Figure 9:
Figure 9:
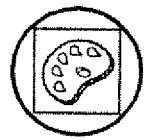
Figure 9:
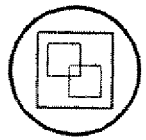
Figure 9:

FIG. 8 illustrates an architecture of a component oriented system according to specific embodiments of the invention. FIG. 9 is a diagram providing additional details regarding the architecture shown in FIG. 8. As will be seen from these figures, an example architecture according to specific embodiments of the invention, includes a number of different components in a connected architecture as further described below. In the model shown, a "MetaVoii" is an executable component that is generally transparent to an end-user and that allows Envoiis PIAs to operate. A MetaVoii 100 has several services attached as parts: Tracking, Communications, ORB and Security. The parent of a MetaVoii on a client machine can be a remote server MetaVoii 101, such as one located at Envoii.com. A PlaceVoii 110 allows an Envoii PIA to exist in a particular place, such as a browser window or a desktop. In FIG. 8 there are two PlaceVoiis, the one on the left has three children or "kid" connections 112. In this case, these are each connections to Envoiis 120 that have a visual component are a perceivable, such as a CreditCardVoii a BusinessCardVoii, a BottleVoii, or a LogoVoii. In the indicated sub-composition 120c, there are 2 skins attached, for example a tracking skin connected to the tracking manager and a skin setting properties on a viz. The other indicated composition is an example of a quite simple composition with a MetaVoii and two places, with a very few non-structural connections indicated as dotted arrows.

In FIG. 9 is explained the various symbols used in the architecture illustrated in FIG. 8. In particular, A=Envoiis (or "Enodes"). As an instance of a class, it provides generic graph interface. The connection points are representative of open set of "ports" which enable connections to other enodes; B=a "Kid" connection, which is a specialization of a "Part" connection. It is the primary glue which is used by designers in building compositions. It effectively helps implement a tree-hierarchy as in the current system; C=a "Part" connection. Part connections are structural, and enforce a part/part-of protocol; D=a representative dynamic connection. Some such connections may be transient, and others not; E=a "skin," and it bears a part-of relationship to an envoy; F=a "Viz" and it bears a part-of relationship to an envoy; G=a "DisplayManager." It is part of an envoy which provides a rendering service; H=an "Event Service." An "Envoii," as an instance of a class, provides generic graph interface. The connection points are representative of open set of "ports" which enable connections to other Envoiis. A "Kid" connection, which is a specialization of a "Part" connection, is the primary glue used by designers in building compositions. It effectively helps implement a tree-hierarchy as in the current system. Part connections are structural, and enforce a part/part-of protocol. A dynamic connection can be an transient connection or not. A skin or SkinVoii bears a part-of relationship to an Envoii. A viz bears a part-of relationship to an Envoii. A DisplayManager is a part of an Envoiiwhich provides a rendering service. An "Event Service" is also indicated, as described below.

According to specific embodiments of the invention, the architecture can be understood as a node-based architecture, with a number of "Envoiis." Envoiis, as described further herein, include active components that can be either MetaVoiis, PlaceVoiis, or Envoiis. Envoiis can be of various types, generally with various functionality and with particular and characteristic visual components. For example, a BusinessCardVoy is illustrated in FIG. 1 through FIG. 7. As shown in those figures and described above, the BusinessCardVoy has the appearance of a business card and connects to appropriate services. Other Envoiis can include such things as an advertising item (such as a soft-drink bottle that provides interesting user interactivity), a credit card, a representation of a globe, etc.

An example implementation of an interactive graphical object or agent (herein referred to as an Envoii) according to the invention provides the following services: (1) Envoiis, using built-in traversal capabilities, can perform service retrieval. This means one can ask an Envoii: "Find me service Foo" and the Envoii will return a reference to a service of type Foo, if one is available. In particular embodiments, service requests are propagated from child Envoiis up to parent Envoiis. In some embodiments, atop level parent will be an external server that provides a library or references to all available services. (2) Effectively, the semantics (real-world behaviors like rendering, animation, etc.) are implemented through Envoii services. (3) Envoiis provide support for an arbitrary number of connection points, referred to herein as "ports." These ports can be named, and provide type signatures, etc., in the form of interface specifications. (4) Envoiis are constructed and added to a tree composition. (5) Envoiis are connected to one-another through the use of objects called "connections." Connections are generally from port to port, and have explicit references to two ports. (6) Mechanisms are provided for search and traversal of Envoii hierarchy.

Generally, relations between Envoiis are based on the same connection mechanism. Interfaces—Each Envoii supports a set of interfaces identified with a unique interface ID. All Envoiis will inherit default Interfaces and add their own specific Interfaces. When a client Envoii wants to establish a connection to another Envoii's Interfaces, it needs to have a reference to that server Envoii. Either it already has that reference (for example because it structurally knows the server Envoii) or it will get the reference through the Service Discovery mechanism. Using that reference, the client Envoii will query the server Envoii to check that the Envoii actually supports the desired interface. At that point the communication between the Envoiis can be established. The communication is asymmetric in the sense that it has a client/server aspect. Symmetric communication can be established between two Envoiis by establishing two connections. The standard Interfaces include the Service Discovery support, symmetric communication protocols, etc.

Ports—Both ends of the communication are managed symmetrically by ports using a channel. Because an Envoii can have several connections to the same interface, each connection needs to have it's own port. In a sense, a port on the server side is an instantiation of the interface. The port on the client side it conceptually similar to a proxy.

Channel—The actual communication between the Envoiis will be encapsulated by the ports to travel through a communication channel. The channel is responsible for transporting the interface method calls and their parameters. It also transports direct communication between the ports themselves. The type of channel transport will depend on the relative location of the Envoiis (in process, inter process, remote). Envoii (or Enode) references are unique inside of their identification space.

Place Voiis

In particular embodiments, an architecture according to the invention further comprises PlaceVoiis and MetaVoiis as described below. PlaceVoiis can be understood as a type of Envoii that allows other Envoiis to operate in a particular place. A computer system that first encounters a graphical Envoii through a particular browser (such as Netscape Navigator™, for example), will receive a PlaceVoii allowing existence of that graphical Envoii within Navigator. If a user drags the graphical Envoii to a different application (or if the Envoii is triggered to move spontaneously), such as Internet Explorer™, for example, a different PlaceVoii will be invoked to enable existence within that different application. Likewise, if an Envoii is dragged onto a desktop, a PlaceVoii appropriate for that desktop (in the particular operating system) will be downloaded (if necessary) and invoked.

MetaVoiis

A MetaVoii is an Envoii that exists at the highest level within a user's particular operating system. It detects relocation of a graphical Envoii to a new location and triggers the downloading and invocation of necessary PlaceVoiis to allow existence in different locations. In particular embodiments, a MetaVoii can trigger the loading and invocation of other MetaVoiis for different platforms, such as when an Envoii is relocated from a desktop computer to a PDA or to a different desktop computer on a network.

In particular embodiments according to the present invention, a graphical Envoii always has an ancestor that is a PlaceVoii, and a PlaceVoii always has a parent that is a MetaVoii. A MetaVoii generally has a parent that is a remote authoritative server for providing available PlaceVoiis, services, or other architectural entities. Generally, MetaVoiis and PlaceVoiis will not be associated with graphical objects directly and will operate transparently to users.

Connections

According to specific embodiments of the present invention, a connection specifies a relationship between two Envoiis. In this context, an Envoii can be understood as both an agent with which a user interacts and as a node in the Envoii architecture that supports that agent and may be transparent to a user. Nodes in the architecture provide formalized connection points for various Envoiis and supporting infrastructure.

Special Connections Examples

There are several types of connections that are peculiar to an Envoii system, according to specific embodiments. (1) Part/Part-of Connection is the structural glue that holds together "compositions." It is a directed connection that says, "B is part-of A." The intention here is to provide a formal method for identifying what gets "dragged along" when an Envoii is disconnected from its parent. (2) Kid: The Kid or "Child-of" connection is a special case of the Part/Part-of connection. It will be used to implement hierarchy within Envoii compositions. (3) Special Part Envoiis: All structural connections to an Envoii that are not Kids or Parents are Parts which facilitates service search procedures.

Visuals (Viz)

A Viz is a visual part of an Envoii that is normally perceivable by a user. A Viz subscribes to services such as: (1) Display manager; (2) Spatial Manager.

SkinVoiis (or Skins)

A skin (or SkinVoii) is a part that subscribes to events (user or otherwise) and, in general, operates on the properties of compositions or visuals. A skin can be understood as executable logic that provides interface functions for one or more Envoiis. According to specific embodiments of the invention, because a skin is a part, there is no limit to the number of skins that can be associated with a viz through its connected Envoii. Some of the services that are provided internally as methods to skins in some implementations can also be factored out to. Focus management is one example. Those skins that are interested in "focus" will obtain and connect to a special service called a "Focus Manager". (This is an example of a Skin that is also a service).

SkinVoiis are responsible for interactions between the user and the Envoiis as well as interaction between Envoiis. They implement the behavior of Envoiis. In that sense, they mostly translate events into property value changes. SkinVoiis are parts. As such, a SkinVoii is directly attached to an Envoii and does not have parts or kids. A SkinVoii interacts with the rest of the system through its parent Envoii (service connections, access to property tree, etc.) When an Envoii is serialized (persistence, cut and paste, etc.), its SkinVoiis are also automatically serialized.

According to specific embodiments of the invention, Skin-Voiis are event clients. Once attached to an Envoii, a SkinVoii will generally respond to a ConnectServices call (defined in the nvINode interface) by connecting to an event manager. A given SkinVoii may connect to other services to implement its specific behavior. (Note the spelling is some figures and examples may represent an older spelling using the final syllable "voy." In this discussion, this is equivilant to spellings using the final syllable "voii," which is the currently preferred spelling.) Example code follows: ConnectService (IID_nvIEvtMgr, (void**)&myIEvtMgr);

Once connected to an event manager, SkinVoiis register as event handlers for a set of events defined by a 32-bit mask, as follows: myIEvtMgr→RegisterForEvent(m_EventMask, (nvISkin*)this);

The event manager will then call their PostEvent method anytime an event specified in the mask occurs. SkinVoiis also need to deregister and disconnect from the event manager when the DisconnectServices method is called. Example code follows:

```
if (myIEvtMrg) { myIEvtMgr-
>DeregisterForEvent((nvISkin*)this);
Disconnect (myIEvtMgr);
myIEvtMgr=0; }
```

Skin Voiis Modify Property Trees

When the SkinVoii is attached to its parent Envoii (for example, using SetParent) it is able to get access to the property tree of that Envoii. It is through that property tree that the SkinVoii can modify the state of its Envoii (or parts or kids, etc.).

```
// get property tree
if (m__pTree==0) m__pTree = new nvPropertyTree(0);
myEnvoiiAsANode->GetPropertyTree (m__pTree);
```

Communication Done through Skin Voii

According to specific embodiments of the present invention, the Envoii-to-Envoii communication model allows Envoiis to communicate even if they are not running in the same thread of execution (or even on the same machine). Because the software implementation according to specific embodiments of the invention is neither asynchronous nor re-entrant, communication between Envoiis needs to be synchronized by the event loop of the players. This means that messages between Envoiis should be carried by events, which indicates that communication between Envoiis has to be done through SkinVoiis. From the point of view of the SkinVoii, the communication manager is an auxiliary to the event manager which provides information that completes the communication event itself.

3. Services

According to specific embodiments of the invention, the Envoii architecture is associated with a number of functions referred to as services. Services can be nested. This is especially desirable in the case of the display service, and implicit in the spatial service. All of the functions of an Envoii player (as discussed herein) can be cast as services. Services need not be local. This happens without further effort if one follows the chain of Envoiis up past the MetaVoii level at the local machine to the server level MetaVoii. Example services that may be associated with Envoiis according to specific embodiments of the invention include such things as the Communication Manager, Display Manager, Events Manager, Focus Manager, Memory Management, Tracking Manager, and Security Manager. Not all of these services will be included in each implementation.

4. Communication Manager

The Communication manager allows a skin (or SkinVoii) to communicate with another skin. This skin can be located in the same PlaceVoii, in an other PlaceVoii within the same client or in a remote PlaceVoii. This section discusses the functionality implemented within the Communication Manager (ComMgr) component. The Communication manager (ComMgr) is instantiated at the level of the MetaVoii. In particular embodiments, it inherits from nvNode and is attached as a part of the MetaVoii. The ComMgr is not an Envoii, as it does not have any parent/child connection. The part mechanism allow each Envoii of a composition tree to access this service through the ConnectService method implemented in the nvNode interface. There will be an instance of ComMgr component for each instance of the MetaVoii within one client.

The communication manager allows skins to send and receive messages, with each message an instance of Skin-Message class. This class contain the message send between skin and routing/addressing information.

The nvIComMgr Interface

Each Envoii in the composition tree can request a connection from the ComMgr service (interface). An example embodiment source code is provided below.

```
//* Definition of the class/interface nvIComMgr
class nvIComMgr : public nvIUnknown { public:
// Interfaces used by the MetaVoii of the Communication Manager
virtual NVSTATUS Init( )=0;
virtual void RegisterMetaVoii (IMetaVoii *theMetaVoii)=0;
// Interfaces used by the PlaceVoii
virtual NVSTATUS ForwardedMsg(unsigned long MsgId)=0,
virtual NVSTATUS SkinRemoved(unsigned long skinId)=0;
virtual NVSTATUS OnDeath( )=0;
// Interfaces used by SkinVoii/oldvoy
virtual NVSTATUS SendMsg(SMSG_SCOPE scope, SkinMessage
sMsgToSend)=0; virtual
NVSTATUS SendMsg(const char *ipaddr, unsigned long port,
SkinMessage sMsgToSend)=0;
virtual NVSTATUS GetSkinMsg(unsigned long MsgId, SkinMessage
&sMsgToGet)=0; };
```

The MetaVoii creates an instance of ComMgr, initializes it, and registers itself with this component (back pointer to the MetaVoii interface). The PlaceVoii received WM_CM_SKINMSG in its event loop. If the MsgId parameter is zero, the PlaceVoii forwards the message directly to its instance of ComMgr. If MsgId is not zero and the skin requested by this message is registered for event in this PlaceVoii, it will translate it as NV_SKINMSG event and send it to requested skin event loop.

The communication manager offers two methods to send messages from one skin to the other. If the skin initiator does not know the specific location of the destination skin, it uses a sendMsg with a scope of search. The scope can take the following value: SAME_PLACEVOII; LOCAL_PLACEVOII; REMOTE_PLACEVOII. If the skin knows the IP address and the port number of the PlaceVoii, it uses the second form of the sendMsg.

Sending Messages

Figure 10:
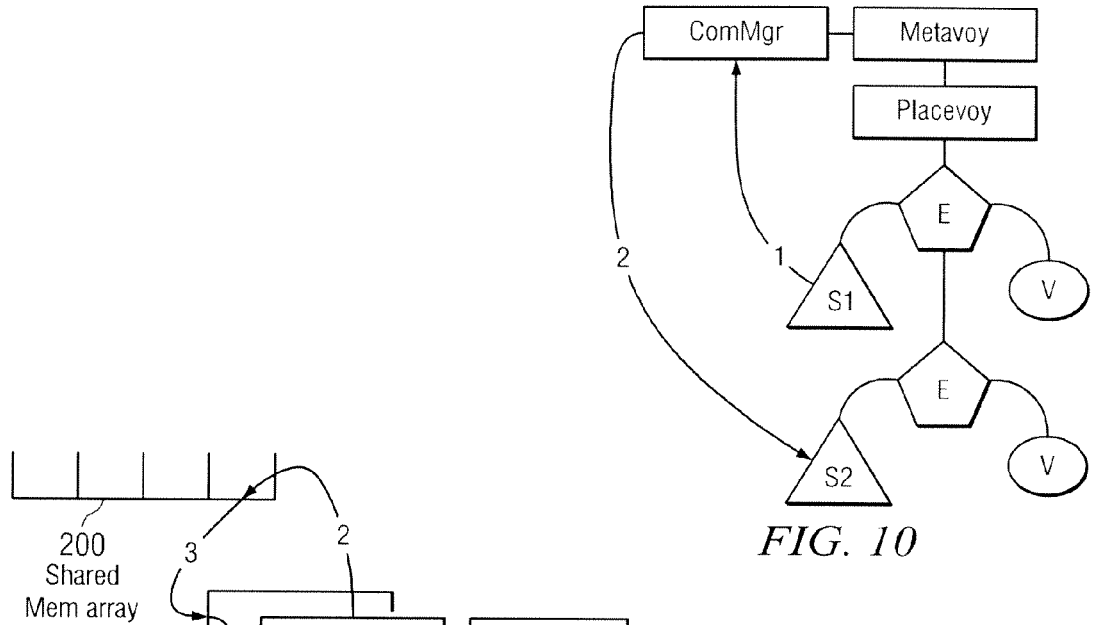
FIG. 10 is a block diagram showing sending a message using SkinVoiis into the same PlaceVoii according to specific embodiments of the invention.

FIG. 10 is a block diagram showing sending a message using SkinVoiis into the same PlaceVoii according to specific embodiments of the invention. In this and the related Figures, triangles with "Sn" notation inside denote skins, pentagons with an "E" inside denote Envoiis, and ovals with a "V" inside denote Vizes (or visuals) According to specific embodiments of the invention, for the skin S1 (skin with id 1) to send a local message to the skin S2, it will create a skinMessage and send it the ComMgr as follow:

```
SkinMessage sMsg;
sMsg.SetMsgType(SkinMessage::SKIN_MSG_SMSG); // type of this message
sMsg.SetRequestedId(2);                      // identifier of the skin
    S2
sMsg.SetRequestorId (GetSkinId ( ));         // requestor id
sMsg.SetParam1(250);                         // the message we want to send
    to
myComMgr->SendMsg (nvICorriMgr :: SAME_PLACEVOII, sMsg);
```

When the send method is called, the ComMgr will ask its PlaceVoii if the requested skin is registered for events. If so, the ComMgr will store the message into a shared memory list, generate a MsgId and then using the MetaVoii interface will post a WM_CM_SKINMSG with a MsgId and a SkinId as a parameter. Upon reception of this message the PlaceVoii will convert the message into a NV_SKINMSG and send it to the event loop of the requested skin. On reception of the NV_SKINMSG the skin will proceed as follow:

```
SkinMessage sMsg ;
myComMgr->GetSkinMsg(MsgId, sMsg);
if (sMsg.GetParam1( )>250)
    // do what ever you have to do with that
```

Figure 11:
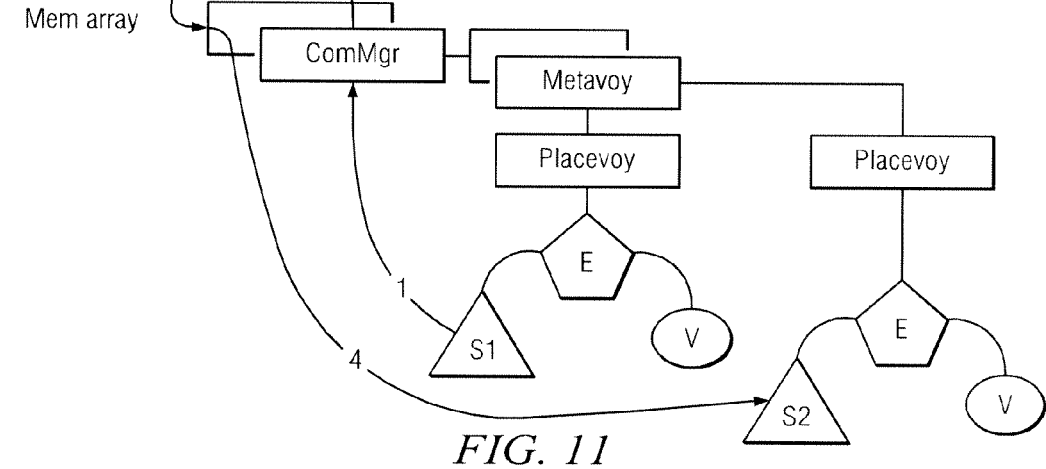
FIG. 11 is a block diagram showing sending a message using SkinVoiis into a local but different PlaceVoii according to specific embodiments of the invention.

FIG. 11 is a block diagram showing sending a message using SkinVoiis into a local but different PlaceVoii according to specific embodiments of the invention. Upon reception (step 1) of a SkinMessage with a SAME_PLACEVOII scope, the ComMgr will store the message into a shared memory array 200 and assign it a message Id (step 2). Then, from the list of PlaceVoiis provided by the MetaVoii it will post a WM_CM_SKINMSG to all the PlaceVoiis (except itself) with a message Id and requested skin Id as a parameter (step 3). Upon receiving this message, the PlaceVoii looks if the requested skin is registered for the event; if so, it forwards the message to the event loop of the skin (step 4). It is possible with this method that two PlaceVoiis receive the same message. If both of them have the requested skin, the first one that called GetSkinMsg will received the SkinMessage. This figure also illustrates an alternative embodiment wherein there can be multiple instances of the MetaVoy on a client machine, one for each different PlaceVoii.

Figure 12:
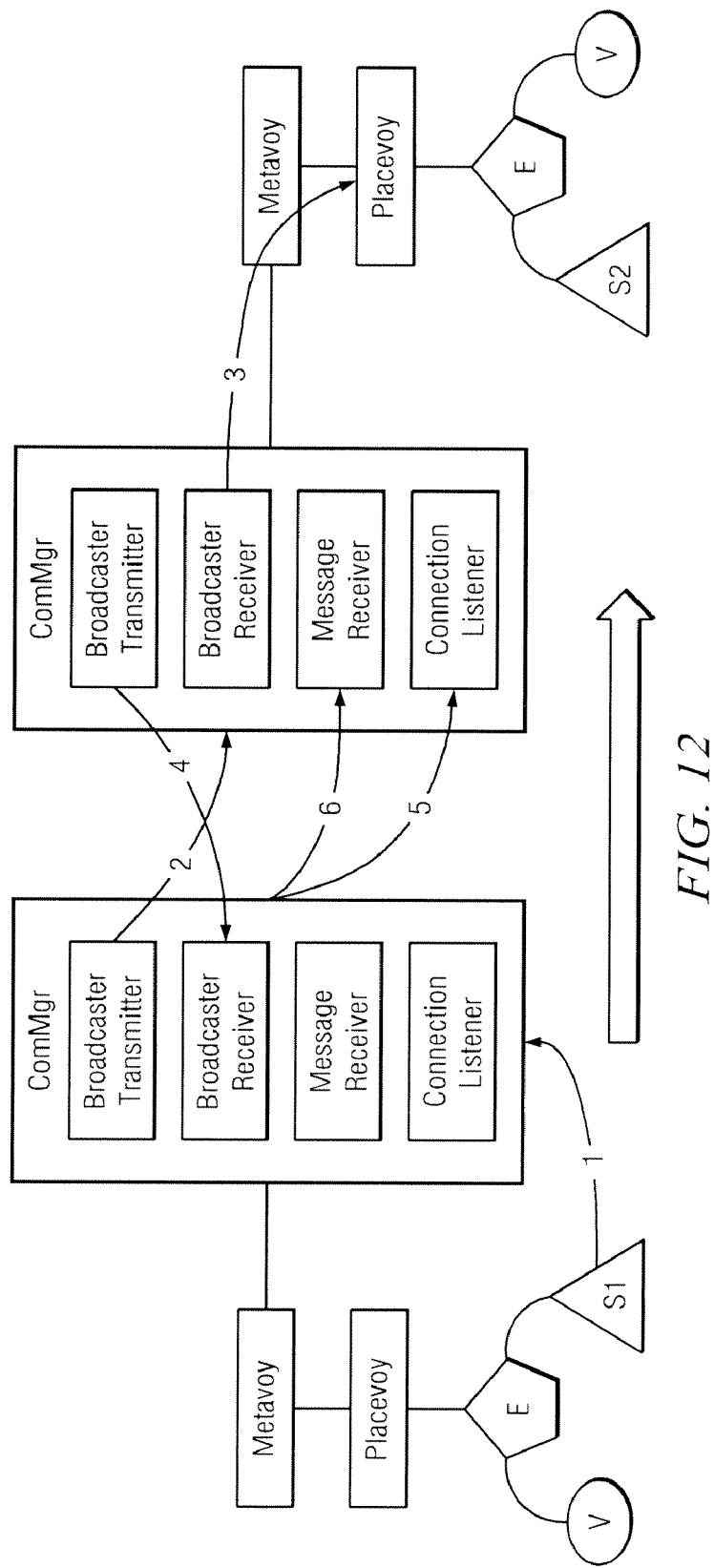
FIG. 12 is a block diagram showing sending a message using SkinVoiis into a remote PlaceVoii according to specific embodiments of the invention.

FIG. 12 is a block diagram showing sending a message using SkinVoiis into a remote PlaceVoii according to specific embodiments of the invention. Skin S1 wants to send a message to S2 using a REMOTE_PLACEVOII scope (step 1). On reception of this message, the ComMgr stores the message into a shared memory array (not shown). Then. ComMgr creates an IS_YOUR_SKIN SkinMessage message type and broadcasts it on the local area network (step 2). When the broadcaster receives an IS_YOUR_SKIN message, it forwards it to all the local PlaceVoiis (step 3). When the PlaceVoii receives this message, it checks if the requested skin id is registered for events in its environment, if so, it changes the message type from IS_YOUR_SKIN to SKIN_FOUND and updates the connection port to this PlaceVoii. The message is then sent back to the origin (step 4). Using the IP address and the port contained in the reply message the ComMgr establishes a connection to the remote PlaceVoii (step 6). Once the connection is established, it sends the message stored into shared memory using this connection. This process is only made once per requested skinId. The next time S1 wants to send a message to S2, the ComMgr will check first if it already had a connection to this skin, and then send the message directly through this connection object. Search scopes can be combined using the OR operator. For a SAME_PLACEVOII|LOCAL_PLACEVOII|REMOTE_PLACEVOII scope request, the ComMgr will first look in the current PlaceVoii for the availability of the requested skin. If not available, it will then look at all the local PlaceVoiis, and then if the requested skin Id is not found within the local client, it will look for a remote client. The skin will not know if the message is sent locally or remotely.

Each ComMgr instantiates a Broadcaster object. A Broadcaster object creates a connectionless socket (such as using UDP) to a specific port (e.g. 1234). Each instance of the broadcaster has the ability to broadcast messages to a local area network. The first instance of the broadcaster will create a listening thread that will receive all the incoming broadcast messages. Upon reception of those messages, it will forward this message to all the PlaceVoiis within this client. In the current implementation the only message received on this port are IS_YOUR_SKIN message. Each instance of the ComMgr will create a thread which will be listening to pending connection. This thread is also in charge of checking all the connection object for incoming messages. Incoming messages are stored in the shared memory array and then the PlaceVoii is notified through its event loop.

5. Push Server

Figure 14:
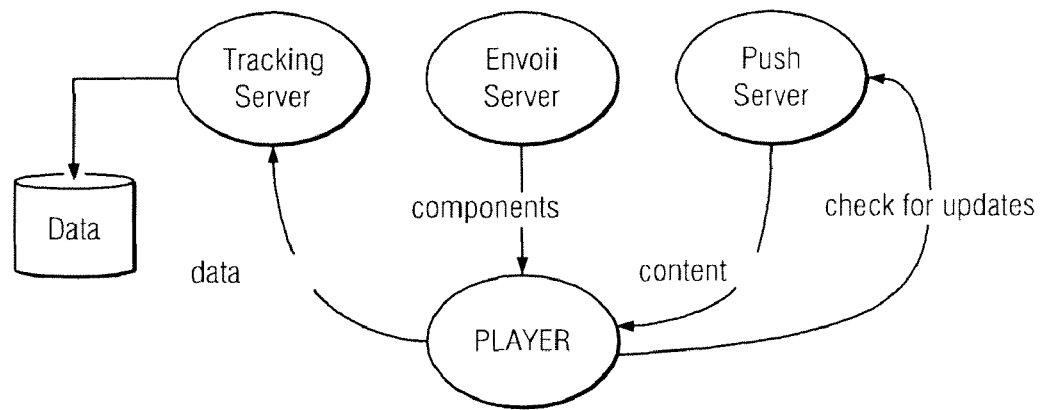
FIG. 14 is a block diagram showing a representative example of a push server according to specific embodiments of the invention.

FIG. 14 is a block diagram showing a representative example of a push server according to specific embodiments of the invention. A Push server provides content on demand for Envoiis that are push enabled; a push enabled Envoii has in its properties the address of a push server to which it connects periodically (the period can be defined in the Envoii) to check for updates. There can also be a push protocol, such that if the server has updates, it sends them to the Envoii for immediate refresh. For example, a softdrink bottle Envoii can carry an advertising message and subscribe to a push server for message updates. This and following Figures contain other elements of external communications that are not part of all embodiments.

6. Community Server

Figure 15:
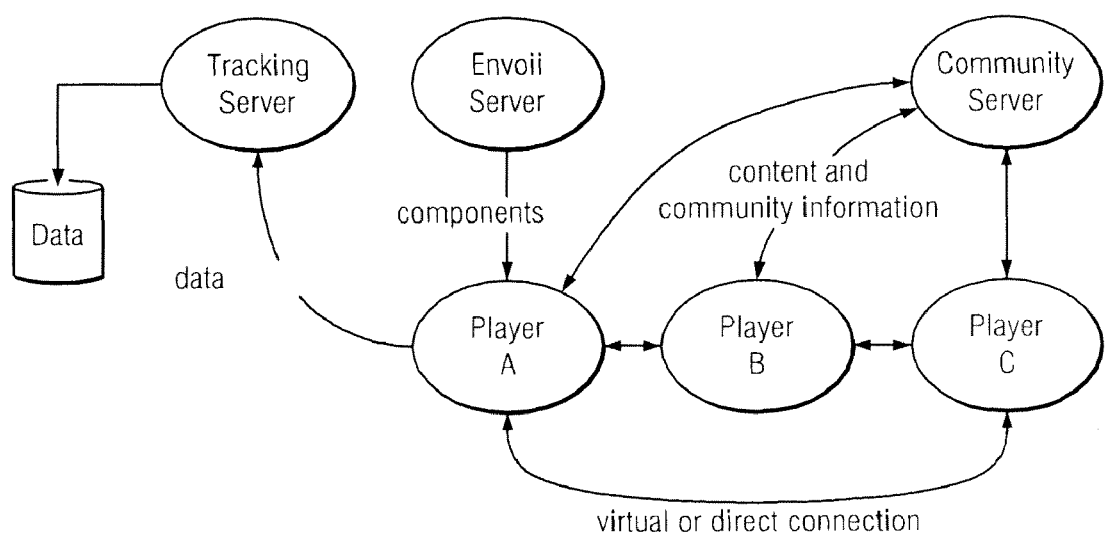
FIG. 15 is a block diagram showing a representative example of a community server according to specific embodiments of the invention.

FIG. 15 is a block diagram showing a representative example of a community server according to specific embodiments of the invention. A Community server provides a way for Envoii users to find each other and communicate with each other. Napster or Icg are examples of community-based connections that are similar to Envoii community servers. This facility provides a powerful way for clients to do community marketing.

7. Tracking Manager

Tracking is the ability for a player to gather data about how the user interacts with Envoiis, and then to send this information through tracking servers. For example, tracking how many times the user has clicked on an Envoii in a certain period of time, how long he left his mouse above it, etc. Tracking is completely anonymous. That means the system never makes any link between the data collected and the machine or the person who originated that data. Also, there is only tracking of Envoii deployed objects, no information is collected on the end user.

Figure 13:
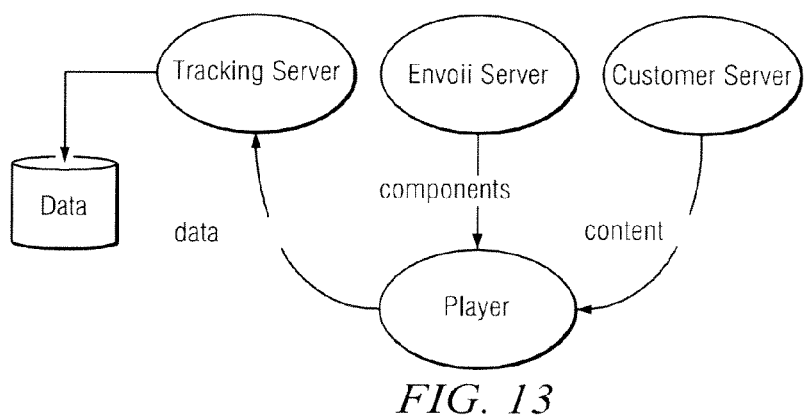
FIG. 13 is a block diagram showing a representative example of tracking Envoii PIA actions according to specific embodiments of the invention.

FIG. 13 is a block diagram showing a representative example of tracking Envoii PIA actions according to specific embodiments of the invention. This is the normal topology for tracking. Each player talks to three different servers: the Envoii server provides the Envoii components; the Customer server provides the content and customized components; and the Tracking server collects the tracking data for all players in the world. In these and other figures, communications with remote servers or players will be understood from the teachings provided herein to be over any available data communication channel, such as the world-wide Internet.

According to specific embodiments of the invention, a tracking system tracks events. It can use a special tracking SkinVoii that records specific events and forward them to a Tracking Manager at the player side. The Tracking Manager stores the data in a local file. Periodically, the Tracking Manager connects to the Tracking Server and sends reports.

Envoii Identity

For tracking information to be relevant, according to specific embodiments of the invention, the system provides a method for tracking the source Envoii. There are different possible levels of identification according to specific embodiments of the invention: (1) Envoii class level: for example, a graphical soft drink bottle Envoii. The system can track all clicks on all the bottle Envoiis in the world. (2) Envoii object level: e.g. to differentiate the clicks on two bottles living in the same place, for example a web page. (3) Player level: to differentiate a bottle on one user's desktop from a bottle on another user's desktop. (4) World level to identify a specific instance of a bottle Envoii throughout the world. To provide all these levels of identification, according to specific embodiments of the invention, a tracking system uses different kinds of IDs with different allocation methods. The way these IDs are allocated and propagated is linked to the Envoii life cycle, and Ids can be predefined properties with a special property type.

Player ID

Figure 16:
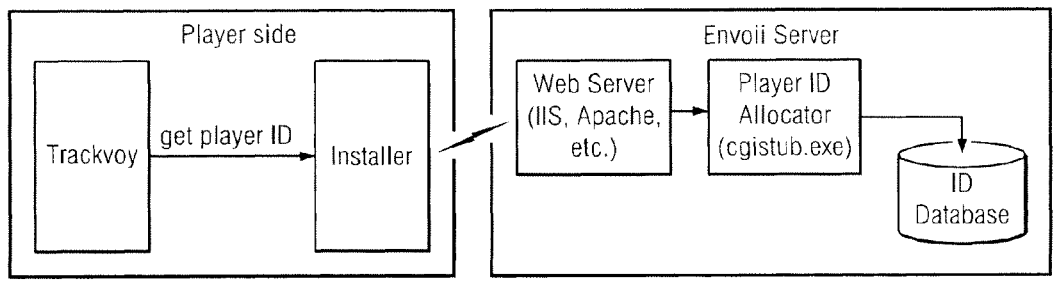
FIG. 16 is a block diagram showing a representative example of a TrackVoii requesting a player ID according to specific embodiments of the invention.

To identify players throughout the world, according to specific embodiments of the invention, every player when installed registers with the Envoii server for a new Id. To do that, the invention delivers "virgin" players, i.e. players without an Id. During the first installation, the installer or bootstrap will try to connect to the Envoii server and request a new ID. FIG. 16 is a block diagram showing a representative example of a TrackVoii requesting a player ID according to specific embodiments of the invention. The Envoii server holds a player ID database. If a player ID is not received at installation, the local system still collects tracking data. A background process called TrackVoii will regularly check if the local system is online or not and if online without a player ID, it will request one to the Envoii server.

According to specific embodiments of the invention, player Ids can be stored with 4 bytes, which allows $2.^{32}$ players in the world. A redirection mechanism on the server (e.g. in the CGI script) can be used to allow multiple servers, or to handle temporary server unavailability. The ID database can also count how many player Ids have been allocated per platform. On the end user machine, player Ids can be stored in different places, such as one of the player components (for example, the ORB (discussed herein) through a patch to DLLs). Ids may also be stored in the registry, though this location is liable to loss or modification by the user. Another option is the data directory, but this presents some of the same problems as the registry. According to specific embodiments of the invention, both in the registrg and in the data directory is one choice.

Customer ID

According to specific embodiments of the invention, it is essential that Envoii customers (for Example, First Union Bank as described above) get tracking data on Envoiis deployed by those customers only. That means Envoiis must know to which customer they belong. According to specific embodiments of the invention, each customer has a customer ID (which can include a convenient number of bits, such as two bytes) and that id is stored by Envoii creation tools in the Envoii at compile time.

Class ID

According to specific embodiments of the invention, customers can differentiate tracking data for different types or classes of Envoiis (for example a bottle Envoii versus a logo Envoii). This is done using the Envoii Class ID. Envoii class Ids are allocated by the content creators that will keep track of the allocated Envoii class Ids.

Envoii Local ID

The Envoii local ID is a local number inside a place. Envoiis of the same class ID and same customer ID have different local Ids in the same place (web page, desktop, etc). This ID can be set at compile time for objects that will be created when the composition is created. For dynamically created Envoiis, local Ids can be allocated automatically, or with the help of specific scripting functions.

Normal Envoii ID

Normally, Envoiis do not need unique identification throughout the world. So the normal ID is simply the combination customer ID:Envoii class ID:local ID. In one example embodiment, the total size is 6 bytes. When a normal Envoii is copied, the Envoii ID is copied and a new local ID is allocated. When a normal Envoii is moved (Cut & Paste), the Envoii ID is unchanged. This will happen in the Copy/Paste and Drag & Drop operations.

Global Envoii ID

According to specific embodiments of the present invention, a Global Envoiis can be created with a unique identification throughout the world. This is accomplished using UUIDs (similar to those used for C++ class Ids). UUIDs are a 16 byte structure made from the following numbers: (1) The current date and time (2) A clock sequence and related persistent state to deal with retrograde motion of clocks (3) A forcibly incremented counter to deal with high-frequency allocations (4) The truly globally unique IEEE machine identifier, obtained from a network card (the implementation does not require a network card; if no network card is present, a machine identifier can be synthesized from highly variable machine states and stored persistently.) (The allocation algorithm is defined in Chapter 10 of "DEC/HP Network Computing Architecture Remote Procedure Call RunTime Extensions Specification Version OSF TX1.0.11" by Steven Miller, Jul. 23, 1992. This is part of the OSF DCE documentation.) When a normal Envoii is copied, a new Global Envoii ID needs to be allocated. When a global Envoii is moved (Cut & Paste), the Global Envoii ID is unchanged. This will happen in the Copy/Paste and Drag&Drop operations. Global Envoiis have to define which life cycle operations they allow. For instance, they could refuse to be copied. Thus, a Global ID can comprise the combination customer ID:Envoii class ID: UUID.

The Envoii ID can be stored according to specific embodiments using properties, which will provide a standard way to access the Envoii ID. According to specific embodiments of the invention, a special type of property (nvPropertyEnvoiiID) is in scripting, using a reserved property name called_EnvoiiID. Envoiis IDs generally are encrypted before serialization.

Tracking Reports

The tracking components on the player side collect all the tracking events sent by the SkinVoiis and store them into a local database. Once in a while, the local database is packed into trackin reports and sent over the Internet to the Tracking Server. These reports are called Reports of Transactions. In terms of implementation, reports of transaction need to be compact but extensible and secure. To verify data integrity, reports use checksums on each packet, plus one checksum on the report header.

Tracking SkinVoiis/Tracking Service

Figure 17:
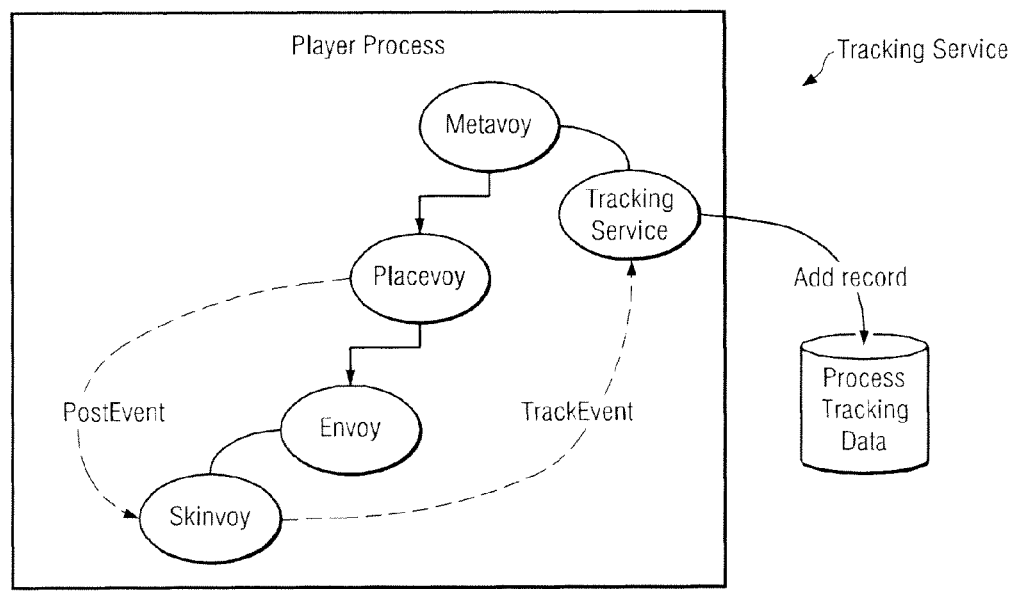
FIG. 17 is a block diagram showing posting of a tracking event according to specific embodiments of the invention.

Tracking data is collected at the skin level. A SkinVoii inherits the capabilities of a base SkinVoii to do tracking. Tracking can be triggered per Envoii. The Envoii is tagged for tracking and needs to have a valid Envoii ID. The tracking flag is a reserved property called_trackable. This may be an integer working like a boolean: 1=tracking enabled, 0=tracking disabled. Other values are also possible. When a SkinVoii is connected to its Envoii, it reads the_EnvoiiID and_trackable properties. If the Envoii is trackable, the SkinVoii connects to the Tracking Manager service. On event reception (in PostEvent), the SkinVoii can decide to post a tracking event to the tracking service, using the TrackEvent( ) method of the nvITrackingMgr interface: void TrackEvent(nvPropertyEnvoiiID& Id, nvTrackingEvent& Event);

FIG. 17 is a block diagram showing posting of a tracking event according to specific embodiments of the invention. A tracking event has a type and a piece of data. The meaning of the data depends on the event type. Event types are stored in 32 bits. Value between 1 and 10000 (included) are reserved for Envoii Inc. Above 10000 are user defined events.

```
enum { EVENT_UNKNOWN = 0,
// Envoii reserved events
EVENT_CLICK = 1,
EVENT_CLONE = 2, // for example
EVENT_KILL = 3, // for example
EVENT_MAILTO = 4, // for example
// user events are used to extend tracking events. SkinVoiis can post
// specific user events with a value > EVENT_USER. These events will
// be sent to the tracking server in RTA packets of class History.
EVENT_USER = 10000 };
```

Each player (=each process) will dump its tracking data into a different file (Process Tracking Data). This is to avoid using any file locking mechanism that would be non-portable to MacOS. This file is a collection of fixed length records with records added at the end. According to specific embodiments of the invention, every 5 minutes or so, the tracking service will rename its tracking data file with a different extension (for example .rdy) and start dumping into anew file. The tracking service is waked up every minute by the PlaceVoii (using the PlaceVoii timer).

Figure 18:
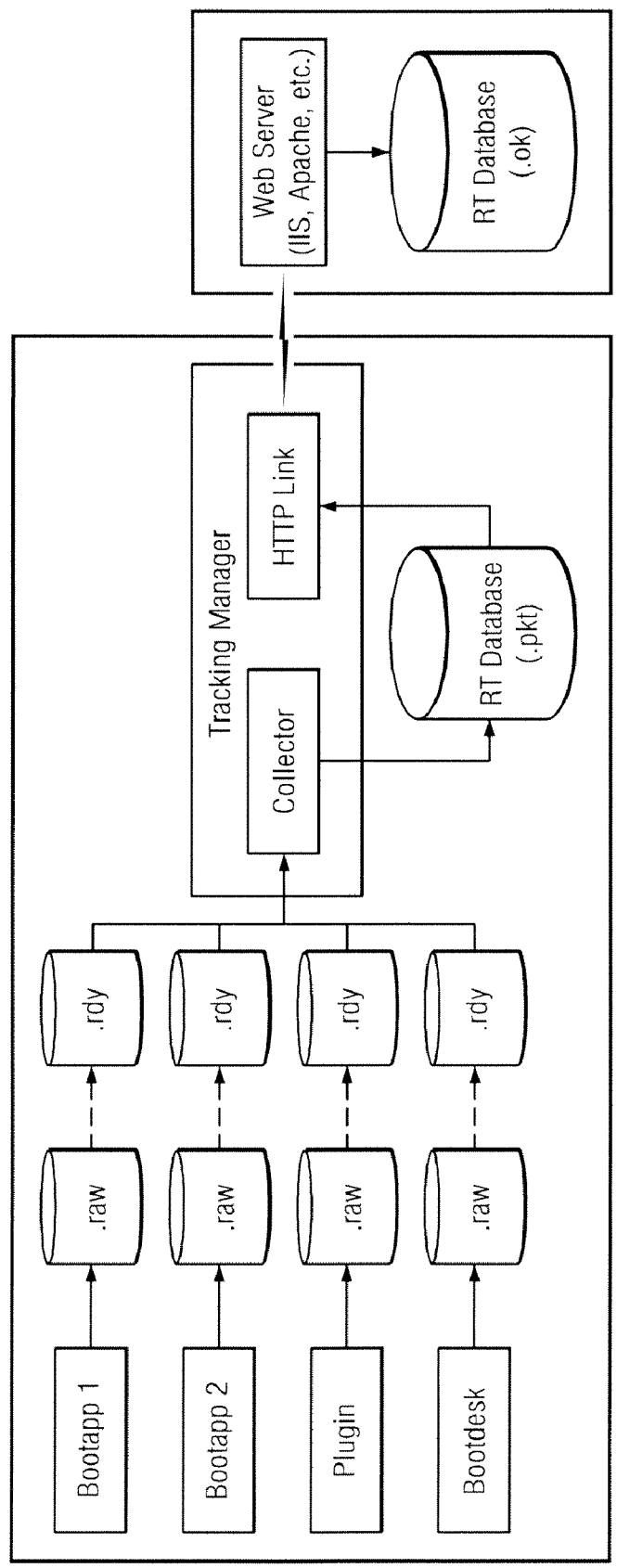
FIG. 18 is a block diagram showing an example of tracking file processing according to specific embodiments of the invention.
Figure 19:
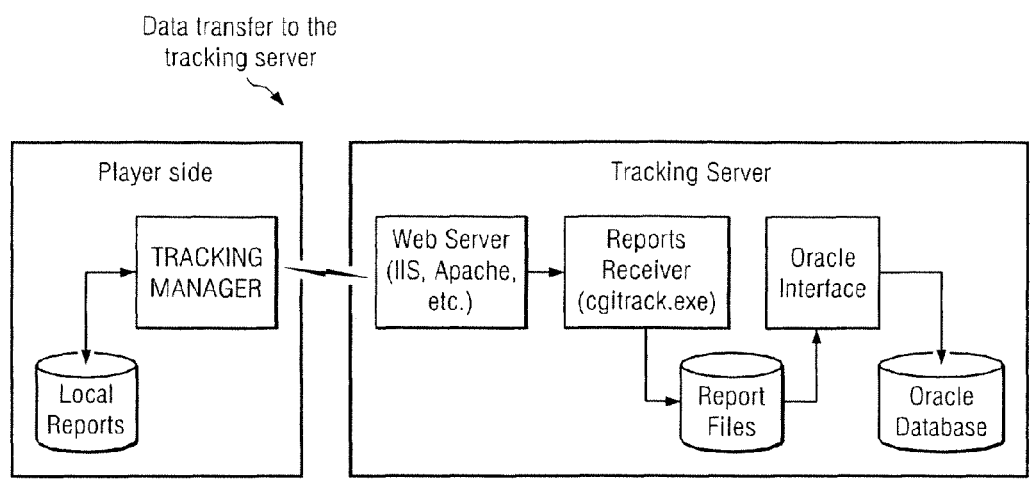
FIG. 19 is a block diagram showing a representative example of tracking data being forwarded to a third-party database server (such as Oracle), according to specific embodiments of the invention.

FIG. 18 is a block diagram showing an example of tracking file processing according to specific embodiments of the invention. The Tracking Manager (TrackVoii.exe) is a separate process that will poll for the .rdy files and process them. Again, using a separate process will avoid any locking mechanism between the processes. The application is called TrackVoii. There is not needed any interprocess communication. PlaceVoiis will automatically start a tracking manager process every N minutes. According to specific embodiments of the invention, only one tracking manager can be running at a time. Thus, unnecessary tracking managers will die immediately. Every Z minutes, the tracking manager terminates. With this very simple mechanism, tracking managers will be running only when needed. They will die automatically to make sure there is no unnecessary overhead. They also die when the system shuts down. To do so, they create an invisible top window and process the WM_QUERYENDSESSION and WM_ENDSESSION messages.

Files are created and parsed using the nvArchive object. That will ensure correct byte ordering, and provide a easy way to transfer data between the binary file and the structures in memory without bothering about byte alignment (which changes a lot across platforms). Raw data files are comprised of a header and a collection of fixed length records. A tool called rdydmp can be used to dump .rdy files into text files. According to specific embodiments of the invention, each record includes the following fields: Place Type, CustomerID, ClassID, LocalID, GlobalID, EventType, EventTimestamp, and EventData.

For processing a .rdy file according to specific embodiments of the invention, read every record, and update the RT database correspondingly. When the file has been processed, it's deleted. Also, check for out of date raw data files, that is files that were never renamed into .rdy files, because the player was not terminated correctly.

In order to make the reporting mechanism as simple and reliable as possible, according to specific embodiments of the invention the invention uses an HTTP request because it is simple, reliable, allows a 2-way communication, and goes easily through firewalls. The report is sent in the data of the HTTP request and results are retrieved in the HTTP answer. On the Web server, there is a CGI script that saves the report to a file on the server. A separate reads this file and adds the corresponding data into a database (such as Oracle). This process will run asynchronously to the CGI script.

The Report Receiver will verify the integrity of the report. If the report is correct, a file name is allocated and the report is saved in that file. The receiver answers OK to the Tracking Manager. The Tracking Manager can delete the report from his local database. If the report is corrupted, the receiver logs an incorrect report incident (with some information on the report), and them answers ERROR to the Tracking Manager. In case of an error, either from Report Receiver or in the protocol with the Web Server, the Tracking Manager keeps the report for retry. According to specific embodiments of the invention, there may be a mechanism to discard incorrect reports in case they were corrupted on the player side and the Tracking Manager can check the integrity of the report with the same routine than the Reports Receiver.

8. Security Manager

Security is designed to ensure that the system as a whole is protected against malicious attacks as well as against internal mistakes. Important factors in assessing the need for security are: How much would a failure cost? How much does protecting against that failure cost? What is the perception of users? While there is always a way for a motivated and talented hacker to subvert a system and there is no way to reduce the talent level, the motivation level is pretty much under control of system design.

Components Integrity

Components are chunks of executable code that will be loaded and run by the players. As such they are capable of doing anything an executable is allowed to do on the clients' systems. This clearly pinpoints them as preferred targets for malicious attacks. In one design, according to specific embodiments of the invention, an authoritative server is the only source of components. This provides some added security.

With a highly controlled Envoii server as the only source of components for the users, this scheme cannot be subverted as long as the address from which components are to be fetched only comes from the Envoii server (as opposed to: comes from a page content). In addition to the single-source protection, components can carry a Verisign (or somesuch) identification to comfort users. Thus, the address used to fetch Components must be defined only by components. Components should use a system like Verisign Components safety.

Scripting

Scripts, just like components, contain executable code. However, there are two big differences: Scripts come from many sources. Scripts do not run in native code on a user's system but in the Envoii byte code inside a virtual machine. The first point makes security more difficult, and the second allows greater security measures to be taken. Because, according to specific embodiments of the invention, anybody can become a source for scripts simply by putting some Envoii content that refers to such script on a Web page. This means that, at least theoretically, anybody can run byte code inside of the Envoii virtual machine. Thus, the invention according to specific embodiments of the invention takes special care in defining the kind of access to the host machine's resources that is granted in the scripting language.

Tracking

Tracking also includes security against the emission by a tampered component of fake tracking reports. While the motivation for that is low unless there is some kind of reward attached to interacting with an Envoii and this kind of reward mechanism should only be implemented through communication, not tracking. To have any kind of significant impact on the overall reports, the fake reports would need to be very numerous. This kind of oddity should be very easy to spot on the tracking server side with basic statistical analysis and further the system can include a very low-level filter for impossible reports at the level of the tracking service just to make things a little more difficult for a hacker.

Communications

Communication channels established between Envoiis on users' systems and clients' severs might carry sensitive information so there is a risk (as for any transaction on the internet) of eavesdropping. User/client transactions therefore are encoded using the highest levels of encryption available (SSL or such).

9. Other Components

Display Manager

Executable code that enables display of Viz in different locations. Generally, there is one DM for each PlaceVoii.

Events Manager

Can either be per platform or in some cases additional events anagers can exist in various local nodes on the tree.

Focus Manager

Not all Envoiis and their attached skins care about focus. Those that do register with a skin that is a focus manager.

Memory Manager

In specific embodiments, this can happen in a nested way, so that Envoiis get their own local memory manager which requests a block of memory from its (parent) memory manager. A system may need to override C++ constructors to use this system to have a clean way of cleaning up after disconnecting an Envoii.

Namespace Management

This manager provides support for global referencing to various nodes or leaves in an Envoii component-oriented architecture. This is related to Envoii identity. Each Envoii is assigned a locally and/or globally unique identifier. This identifier is used for: (1) Tracking—a compact key for generating reports (2) Finding mobile Envoiis. Identifier is used by remote ORB as search key. Mobile Envoiis need to report place changes to ORB hierarchy. (3) PlaceVoiis will need to know that they are in a special kind of place, like a Mac or PC or PDA. The services they request will need to be instantiated on the basis of their "place identity." PlaceVoiis ask for services like: "MacPlace.EventServer."

10. Service Discovery in Envoii Architecture

When an Envoii is connected to its parent, or connected to any of its "grandparents", it needs to discover and be wired up to a set of services, which will vary from Envoii to Envoii. One primary interface that Envoiis include is service discovery. In specific embodiments, the following method is used: (1) if you are an Envoii, ask your parts first, then ask your parent, (2) if you are a part, ask your Envoii. Thus requests for services flow upstream or laterally (to parts), but not downstream. This is the reason for the distinction between parts and kids. Because, according to specific embodiments of the present invention, services are nestable (multiple instance of the same service within the tree), the first service encountered is generally the one that is used, unless a particular service at a particular level is asked for by name (like: " . . . / . . . /eventService" or "foo.eventService".

11. User Desktop Experience Example Implementation

Figure 21:
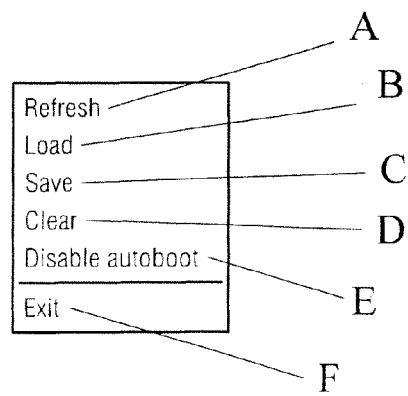
FIG. 21 is a block diagram illustrating a graphical user interface showing an example menu for a desktop PlaceVoii according to specific embodiments of the invention.

According to specific embodiments of the present invention, the desktop experience in windows is based on two different modules: bootdesk and PlaceVoii. Bootdesk is a bootstrap (an executable) module that creates a transparent window to be used as a desktop PlaceVoii. Bootdesk can be started on its own, or it will be started automatically when an Envoii is dropped on the desktop. When bootdesk is running, an icon appears in the taskbar. According to specific embodiments of the present invention, a right click on that icon gives access to a menu with different options to control bootdesk. FIG. 21 is a block diagram illustrating a graphical user interface showing an example menu for a desktop PlaceVoii according to specific embodiments of the invention. In particular, A=repaint the desktop (will fix all drawing problems); B=load the persisted desktop (as if we were booting); C=save the desktop (same file than the one we load when booting); D=clear desktop placevoy (all envoys are deleted); E=disable autoboot (grayed when autoboot is already disabled); F=terminate Envoii desktop.

Transparent Window

Envoiis need a place to live. Basically, a place is a window. In a web browser, the window is provided by the browser. In the application bootstrap, the browser Envoii can be created in a regular window with a caption and a menu bar. For the desktop, according to specific embodiments of the present invention, a window is also needed, but in specific embodiments the window covers the whole screen, without obscuring the desktop. While one solution could be to use the desktop window itself, this does not work (under Windows) because one cannot subclass a window that was created in a different thread.

To meet this problem, the invention created a window that is made invisible and disabled in order not to disturb the desktop. If this window is created as a regular top-level window, there can be three problems: the window can be minimized automatically by the system, the window can appear above other applications, and a bootdesk application button will appear in the taskbar (at the bottom of the screen). To solve these problems, the window is created as a child of the program manager window, more precisely a child of the SysListView32 window (the window displaying the icons over the wallpaper).

Figure 20:
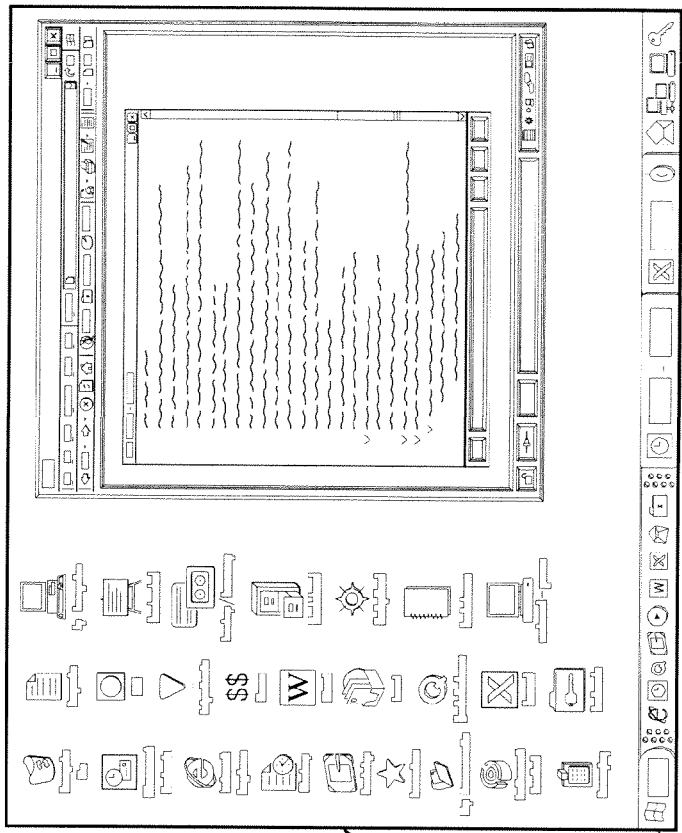
FIG. 20 is a block diagram of a hierarchy for a desktop PlaceVoii according to specific embodiments of the invention.
Figure 20:
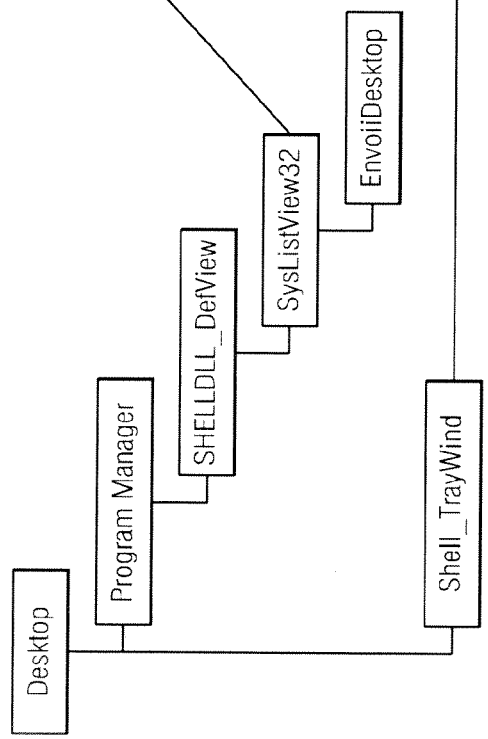

FIG. 20 is a block diagram of a hierarchy for a desktop PlaceVoii according to specific embodiments of the invention. Grayed windows are the ones that actually display something on the screen. The Desktop window is the mother of all other windows. It is responsible for drawing the wallpaper. The Shell_TrayWnd window is the task bar. Example code to find these windows is provided below, using the window class names:

HWIND hWndProgman=Find Window("Progman",NULL);
HWND hWndShell=FindWindowEx(hWndProgman, NULL,"SHELLDLL_DefView",NULL);
hWndShell=FindWindowEx(hWndShell,NULL,"SysListView32",NULL);

Desktop PlaceVoii

How to draw in the created invisible and disabled window and how to handle the mouse inputs is the job of the desktop PlaceVoii. The desktop PlaceVoii uses the same subclassing technique as the plugin and the bootapp PlaceVoii. Subclassing of a window means that the original window procedure is replaced with a new procedure. The window procedure is a function called for every message received by the window. There are two major problems solved by this embodiment of the present invention. The first is how to draw Envoii objects on the desktop and have them move over it smoothly. The second is how to receive user inputs (mouse & keyboard) as well as repaint messages, given that the window is invisible.

Drawing on the Desktop

Drawing a sphere on the desktop is fairly straightforward. Using a regular alpha channel or a blue-screen, one can blit any image with a mask so that only the required pixels go to the screen. For example, that can be done using the SRCAND and SRCPAINT operators of the BitBlit or StretchBlit APIs. The harder problem to solve is how to repaint what was behind a sphere when it is moved. In other places, a PlaceVoii can use a special background mask that always renders itself first. On the desktop, there can be no background, otherwise the desktop would be obscured.

While the invention could ask the desktop to repaint itself when needed, e.g. when damages are pasted to the display manager, that is tricky for two reasons. The first is that there is no easy way to ask the desktop to paint itself without causing a lot of flickering. The second is that Envoiis are painted asynchronously, so it is almost impossible to repaint the desktop (with the icons and everything) in the same way.

Therefore, the invention has to paint the desktop itself. To do that, according to specific embodiments of the present invention, an algorithm saves the pixels of the desktop when and where needed, and then does the compositing between the Envoii rendering cache, the desktop cache and the alpha channel (see appendices for a detailed description).

If a window comes over the desktop PlaceVoii, the desktop PlaceVoii will be clipped automatically by the system, so any drawing in the rectangle of that window will not appear. As soon as that window disappears, because the system will send a WM_PAINT to the desktop windows, the desktop will repaint itself. When this is done, the PlaceVoii needs to repaint itself, That is done with system Hooks and is also a good moment to grab the pixels of the desktop, refresh the Envoii cache and paste the Envoii composition on screen.

Hooks are procedures that the system calls before or after executing certain system tasks like dispatching message. One can place a hook on a specific thread or on all threads. According to specific embodiments of the present invention, the invention places a hook on the Windows manager's application thread. For the repaint issue, hook the GetMessage( ) API to intercept all the WM_PAINT events on the desktop. When a WM_PAINT is intercepted, block the timer event in the PlaceVoii, so nothing is rendered while the desktop is repainting, and start another timer. As long as WM_PAINT is received, keep reseting that timer and merge all the update spans that are repainted. When the system goes idle (no more pending WM_PAINT), it means the desktop has finished repainting. The set tinier will then come to an end, and the PlaceVoii will repaint on the accumulated spans. Before repainting, grab the new pixels on the screen. When that is complete, restart the main timer of the PlaceVoii so that animations can start again.

Receiving Mouse and Keyboard Input

The PlaceVoii window is invisible and disabled so it does not receive any mouse or keyboard input. This ensures that the desktop behaves as usual. To receive input on Envoiis, the invention employs a trick (under Windows) to create a hook that is a callback function that the system will call on every mouse input over a specific thread. In our case, set a hook on the program manager thread. To get the thread id of the program manager, do the following call:
hThread=GetWindowThreadProcessId(hShellWnd),NULL)

Then set a hook:
HookMouseProc=SetwindowsHookEx(WHMOUSE, (HOOKPROC)MouseProc, hInst, hThread, NULL));

In the MouseProc( ) function, forward the mouse messages to the Envoiidesktop indow using PostMessage( ) Generally, only the following messages are forwarded:
WM_LBUTTONDOWN
WM_LBUTTONUP
WM_RBUTTONDOWN
WM_RBUTTONUP
WM_MOUSEMOVE Use the same technique to set a hook on keyboard events to forward WM_KEYUP and WM KEYDOWN messages. Both for the mouse and the keyboard, once the message is received in the PlaceVoii, check if some Envoii is interested in that message. For a mouse message, make sure the message is on a the shape of one of the Envoiis. For a keyboard message, check that one of the Envoii has the keyboard focus (=Envoii has a skin expecting keyboard events+Envoii was given focus by a click in his shape). If an Envoii wants the messages, set the capture of events to the PlaceVoii window, so that the desktop does not handle them in parallel.

Desktop Moving or Resizing

The desktop window used as a parent to the PlaceVoii window can be resized or moved in two different ways: (1) When the one of the dockable windows, like the task bar, is docked on a different side of the screen; (2) When the screen resolution is changed (display properties). In both situations, the PlaceVoii needs to be aware of the changes and resize the PlaceVoii window accordingly. The PlaceVoii window does not need to move the window to a different position because as a child of the program manager window, it is moved automatically. The PlaceVoii sets another hook on the window procedure of the program manager window. The set hook that will be called when the window procedure returns. If the message is WM_SIZE, resize the PlaceVoii window using the Windows API SetWindowPos( ) an then invalidate both the PlaceVoii window and the desktop window. SetWindowPos( ) will send a WM_SIZE message to the PlaceVoii window. The invention handles that message in the OnSize( ) method of nvPlaceVoiiOS.

Persistence

If the user logs off or shut down Windows, the desktop PlaceVoii should serialize its Envoiis in a file, and next time there is a log on (or boot), start bootdesk automatically and deserialize that file. There are three issues: how to serialize/deserialize the desktop, how to detect shutdown, how to start automatically.

Serialization/Deserialization

To serialize all the Envoiis on the desktop in a file, serialize the PlaceVoii in an archive and write that archive to a file. Because serialization is recursive, all the kids and parts of the PlaceVoii will get serialized, as well as all their descendants. Example code follows:

```
// serialize PlaceVoii
PlaceVoii->SerializeProperties(&Arch);
// save archive to desktop file in datadir
nvFile File;
File.bOpen(DesktopFileName,nvFile::WRITE);
Arch.bToFile(&File);
File.Close( )
```

To deserialize, first read the file in an archive and call Placevoii→DeserializeProperties( ). This method will create all the Envoiis recursively. Before deserializing the PlaceVoii, existing Envoiis are deleted using PlaceVoii→RemoveAll( ).

Shutdown Detection

When Windows is shutting down or the user is logging off, the WM_QUERYENDSESSION message is sent to all top-level windows. Applications must return TRUE to allow the shutdown procedure to go on, FALSE to interrupt it. When everybody has returned, Windows sends a WM_ENDSESSION message to every top-level window again, to confirm or cancel the shutdown. If it is confirmed, this is the last message; after that, Windows terminates the application. Because the desktop PlaceVoii window is not a top-level window, it does not receive all these messages. To address this issue, the invention can create a hidden top-level window and use the WS_EX_TOOLWINDOW extended style to prevent the system from creating a button on the taskbar. CreateWindowEx (WS_EX_TOOLWINDOW, "EnvoiiDesktopTopWnd". " ", WS_POPUP|WS_DISABLED, 0, 0, . . . ); In the window procedure the invention handles WM.sub—QUERYENDSESSION and WM.sub.—ENDSESSION. On WM.sub.—QUERYENDSESSION, return TRUE to accept shutdown. On WM.sub.—ENDSESSION, serialize the desktop, set the system parameters to restart bootdesk automatically (see next paragraph) and destroy the PlaceVoii.

Automatic Restart (Autoboot)

If bootdesk is started with -boot in the command line, the desktop data file will be deserialized automatically. So call "bootdesk-boot" when Windows is booting or a new user is logging on. The invention does not use the usual Startup folder because it is language dependent and also it is easy for a user to remove the autoboot by mistake. Instead, add an entry in the resgistry at a key such as: HKEYSURRENT USER\Software\Microsoft\Windows\CurrentVersion\Run. The entry is a command line to execute at boot time. It is a full path to bootdesk with the -boot option. That entry can be verified directly in the registry or use msconfig.exe (check the startup folder).

Forbid Multiple Instances of Bootdesk

To prevent Bootdesk from being started several times (thru icons, shortcuts, etc), bootdesk creates a named mutex at the beginning. If that mutex already exists, bootdesk displays a warning message and exits. Example code follows:

```
// create a name mutex to prevent 2 instances of bootdesk
bMutex = CreateMutex(NULL,TRUE,"EnvoiiDesktop");
if(GetLastError( ) ==ERROR_ALREADY_EXISTS)
{MessageBox (NULL,"The Envoii Desktop is already running.", "Envoii
    Message",MB_OK);
return false;}
```

Desktop Refreshing Algorithm

FIG. 22 to FIG. 25 illustrate an example where a sphere Envoii is moved from position n to position n+1 as shown in FIG. 22. Just before rendering position n+1, save the desktop pixels in the span n+1, minus the pixels in the mask of position n. An example is shown in FIG. 23. Now render position n+1 and compute the corresponding mask as shown in FIG. 23. An example is shown in FIG. 24. Then, perform the compositing between render n+1 and the desktop cache n+1 using the mask n+1. An example is shown in FIG. 25. For each pixel, it's a simple switch of source depending on the pixel value in the mask. Finally blit the result to the screen.

12. CORBA Example Implementation—ORB (Object Request Broker)

According to specific embodiments of the present invention, the invention can be implemented using in part standards-based architectures and protocols for component-based programming. One such standard is known as CORBA (Common Object Request Broker Architecture), which has been developed by the 500+ member Object Management Group (OMG). Another such standard is the Component Object Model (COM), developed by Microsoft. According to specific embodiments of the present invention, the invention can be implemented in either of these standards-based environments. Some knowledge of these standards is presumed in the discussion below.

An Object Request Broker is a special component. It also provides objects, but in general the ORB does not build the objects itself. Instead, the ORB finds a component for the class needed and asks the component to allocate the object. In other words, the ORB is a kind of component manager. In a particular architecture according to specific embodiments of the invention, the ORB is a service. Any Envoii can request that service at any level. The ORB provides anonymous objects and named objects. In a particular OS, the ORB is implemented in a dll. It is loaded only once in memory but there is a separate data segment for each process. If the ORB needs to share data across processes, it can use classic shared memory techniques, though this is not required in all implementations. All objects are provided by components. An object class is identified by a unique ID called a CLSID (CLasS ID). CLSID according to specific embodiments of the invention is a random number that is intended to be unique in the world. According to specific embodiments of the invention, the invention uses the COM format for IDs (128 bits) and the COM id generator GUIDGEN.EXE. The ORB finds objects by name or by unique identifier. If persistent objects move from place to place, they need to register that fact with ORB. ORB exists at Meta level and generally will be nested. Generally, there will be a top-level (e.g. at Envoii.com) ORB for providing new components, primitives, etc., to various user sites.

nvorb is the project implementing the ORB (for VC++, load /src/nvorb/win/nvorb.dsp) Using the ORB is generally done in two steps. First, get an ORB interface to use ORB services. The following is sample code to do that:

```
nvIOrb *pOrb ;
// get path to ORB library
char szPath [255+1];
nGetORBLibraryPath(szPath,sizeof(szPath));
// load ORB library
libOrb.nSetName(szPath);
libOrb.nLoad( );
// get orb factory address
pfnGetORB nGetORB;
libOrb nGetProcAddress(GETORBFUNCNAME, (void**) &nGetORB) ;
// call the factory to get an orb interface
nGetORB ((void**) &pOrb);
```

With the ORB interface, one can call its methods. An example method is nCreateInstance( ), as provided in the example below. In this method, specify a class id, an interface id and a pointer to receive the interface. The ORB will find the component that implements clsid (provided it is in clsid.cfg), load it, create an instance of clsid, and ask this instance for an iid interface. This is returned in pObj.

```
// create an Envoii
nvIEnvoii *pObj;
pOrb-> nCreateInstance(NULL, kCLSID_PlaceVoii, kIID_Envoii,
&pObj);
```

The ORB makes the link between the clients and the components by using a correspondence table between CLSID and components. According to specific embodiments of the present invention, this table is built locally in a file according to a proprietary format. Whenever a new component is downloaded, the component registers its CLSIDs in that table. Later, the ORB is able to communicate with other ORBs to locate named objects (like CORBA ORBs do). The ORB also includes a loader to download components from a component server and resolve dependencies. FIG. 26 is a block diagram illustrating operation of an Object Request Broker (ORB) during a create instance according to specific embodiments of the invention.

Loader

The ORB dll contains another object called the Loader. When a client asks the ORB to create an instance of an object, the ORB looks first into the CLSID table (the clsid.cfg file on disk). If that CLSID is unknown, or its component is missing (deleted by the user for instance), the ORB asks the loader to find that component. Now the loader needs an IP address for an ENVOII server or any other server that can talk with him. The CLSID table provides a list of such servers, in the [SERVERS] section. The communication takes place using the HTTP protocol so as to go through most firewalls without any change in the client configuration. On the server, there is an HTTP server running, which is generally already present because ENVOII servers will have HTTP to provide HTML pages and Envoiis. The Loader connects to the HTTP port of a web server and asks him to execute a CGI program called CGISTUB with the needed CLSID. FIG. 27 is a block diagram illustrating the operation of a load resource according to specific embodiments of the invention.

CGISTUB will now scan the CLSID table on the server for that CLSID. The CGISTUB can provide the web server with his response, which will be transmitted to the Loader. The response is a formatted block of text, with a mime header so that a browser can display it. Upon receipt of the reply, the Loader skips the mime header and parses the response. Zero, one or more components can be specified for download. For each one of them, the Loader checks that it does not have it on the client already. If not, it sends another query to the web server for a direct download of the component. The component is then saved to the ExeDir. When the loader returns, if the component that handles the CLSID has been found and downloaded correctly, the ORB loads that component (and its dependencies) and creates the object and finishes.

CLSID Repository

To find the component that implement a clsid, the ORB uses a CLSID repository. This repository can be implemented as a platform independent text file called clsid.cfg, located in the/common subdirectory of the Envoii data directory. This is an example of clsid.cfg

[CLSID]

{40940D81-0772-11D4-8DAE-0050DACO5DOA}=skeleton.dll

As an example, for Windows: the Envoii data directory is specified in the registry at the following key: HKEY_LOCAL_MACHINE\Software\Envoii\Player\2.0\Data; the Envoii executable directory is specified in the registry at the following key: HKEY_LOCAL_MACHINE\Software\Envoii\Player\2.0\ExeDebug, other components are located at HKEY_LOCAL_MACHINE\Software\Envoii\Player\2.0\ExeRelease.

Resources

Resources are the data files needed by Envoiis to run correctly. For example, images, sounds, music files, etc. Those files can be located on the local disk, when designing new Envoiis, for instance, or they can be located on a web server, just like resources of a web page. Access to resources is generally transparent. To do so, the system uses the nvResource class. For each resource, the system: creates a nvResource object (through the ORB), gives it a name (that will be used in scripting) and a location (local file name or URL), loads the resource, gets a pointer on the data and the data size. Then, once done with the data, frees the resource. Example code is as follows:

```
// create an instance of nvResource
nvIRessource *pRes;
gpOrb->nCreateInstance (NULL, CLSID__nvRessource,
    IID__nvIRessource, (void**) &pRes);
if (pRes!=NULL)
{ // load local ressource
pRes->SetAll("toto1","C:","\\my
    documents\\wrk2.0\\test\\common\\totol.txt",false);
pRes->nLoadRessource( );
const char *pBuffer = pRes->pGetBuffer( );
pRes->Free( );
// load distant ressource
pRes->SetAll("toto2","192.168.37.3","/test/toto2.txt",true);
pRes->nLoadRessource( );
pBuffer = pRes->pGetBuffer( );
pRes->Free( ); }
```

Create an Object with the ORB Interface.

To use the ORB services, code first needs an ORB interface. Here is an example code to do that:

```
// no error handling to simplify reading
nvIOrb *pOrb;
// get path to ORB library
char szPath [255+1];
nGetORBLibraryPath(szPath,sizeof (szPath));
// load ORB library
libOrb.nSetname(szPath);
libOrb.nLoad( );
// get orb factory address
pfnGetORB nGetORE;
libOrb.nGetProcAddress(GETORBFUNCNAME, (void**) &nGetORB) ;
// call the factory to get an orb interface
nGetORB ((void**) &pOrb);
```

With an ORB interface, code can call its methods. Here specify a class id, an interface id and a pointer to receive the interface. The ORB will find the component that implements clsid, load it, create an instance of clsid, and ask this instance for an iid interface. Which is what you receive in pObj. An example method is nCreateInstance( ).

```
// let's create an Envoii
nvIEnvoii *pObj ;
pOrb-> nCreateInstance(NULL, kCLSID__PlaceVoii, kIID__Envoii,
&pObj);
```

All interfaces inherit a base interface called nvIUnknown that implements reference counting and interface querying.

```
class nvIUnknown { private:
// reference count
long m__RefCnt;
public:
// constructor
nvIUnknown(void) {m__RefCnt=0;}
// destructor
virtual ~nvIUnknown( );
// add a reference to the object
virtual long AddRef (void);
// release a reference to the object (auto delete if not referenced any more)
virtual long Release(void);
// query interface
virtual int QueryInterface(const IID & iid, void **ppObj) = 0; };
```

In specific embodiments, reference counting is not only defined but also implemented inside this class. Thus objects implementers do not need to do it themselves every time. So the only method that needs to be implemented is QueryInterface( ). In specific embodiments, there is also provided a class factory interface called nvIFactory, used to build class factories objets in components. The ORB used class factories to create object instances. The algorithm to create an instance is the following:

```
int nvOrb::nCreateInstance(nvIUnknown *pOuter, const CLSID &clsid,
    cont IID &iid, void **ppObj)
{ . . . // 1-find a component for clsid
// 2-get component factory provider
// 3-call the component factory provider to get factory object for clsid
// 4-lock factory server
// 5-create instance of cisid and get iid interface
// 6-unlock server
// 7-release factory . . . }
```

13. Further Example Implementation Details

Player and Player Installer

In order for Envoii PIAs to exist on a client system according to specific embodiments of the invention, an Envoii player is placed on the client machine to handle Envoii PIAs. The Player, according to specific embodiments of the present invention, is made of several elements, the active components of which are discussed below. A set of elements according to specific example embodiments comprises: nvcore.dll, nvorb.dll, Envoii.dll, PlaceVoii.dll, MetaVoii.dll, commgr.dll, bootdesk.exe.

Bootstrap

According to specific embodiments of the invention, Bootstrap is begun the first time a user encounters Envoii content and may also start the first time an application is started. Bootstrap is platform and context dependant. It instantiates the ORB/Loader first and then executes the following boot sequence: (1) Instantiate a MetaVoii; (2) Instantiate a PlaceVoii to match the bootstrap context; (3) Tell the PlaceVoii to instantiate a root Envoii either from persistence data (for example from an HTML page) or from the MetaVoii's clipboard.

Installer

In an alternative implementation, a player is installed with user input. An installer is an executable module that, once downloaded on the client machine, will install the Envoii player in a specific directory, chosen by the user, and setup all the required parameters for the Player to run. This method of executable installation is typical for personal computer type-systems. The installer according to specific embodiments of the invention is used for 3 different tasks: (1) Do the very first install of an Envoii player; (2) Do an update of the Envoii player; and (3) Redo the setup in case the registry or the data directory is lost. The following files need to be in the same directory as the installer: all the components; an information file called Envoii-installer.inf (with the list of components); a table of CLSIDs called Envoii-installer.cfg.

Installing proceeds according to one example generally as follows:

1. Compare the source and destination directory (the source directory is where installer.exe started). If they are the same, assume that the user is trying to redo a setup after a loss of the registry or the data directory.

2. Create the data directory (if it does not already exist).

3. Create the executable directory (if it does not already exist).

4. Update the registry (release number, data dir, exe dir, player ID, proxy settings) and if a player ID is already in the registry, keep it.

5. Copy the Envoii plugin into Netscape and Interne Explorer directories if those directories are present.

6. Copy nvcore.dll and oldcore.dll to the Windows system directory.

7. If a re-setup, go to 12.

8. Copy installer files to the executable directory, to allow a re-setup if necessary.

9. Copy all the components specified in the installation file (Envoii-installer.inf) to the executable directory.

10. Create or update the CLSID iuh|e (clsid.cfg) and after that register all the existing components.

11. If installing a virgin player, attempt to get a player ID from the Envoii server.

12. Register plugin with IE and Netscape to handle .nvo files.

Player ID Allocation

FIG. 29 is a block diagram illustrating assignment of a Player ID from a server according to specific embodiments of the invention. For installing a virgin player (first installation on the client machine), the install needs to allocate a player ID. This is done through a communication with the Envoii server. Once an Envoii player is on a client machine, the Envoii system is able to update any part of that player. This is different from user-defined components update. The player update process can be divided in 3 main steps: (1) detect availability of an update on a server; (2) download the update; and (3) install the update.

14. Example Drag & Drop Implementation

According to specific embodiments of the invention, drag and drop is the ability provided to allow Envoii PIAs to be transported between "places" using an indication method, such as a pointing device such as a mouse. According to specific embodiments of the invention, a user can click on an Envoii, drag it on the screen while keeping the mouse button down, and finally release a pointer to drop the object somewhere else. The place where a user picks up an object is called the drop source. The place where a user drops the object is called the drop target. The object used between the drop source and the drop target is called the data object.

Typically, drop sources and targets are windows from one or more applications, though targest, especially, can be indications of other connected machines. Typically, applications involved in a drag and drop do not have to know each other. They can pass objects to each other provided they share some of the formats that these objects can take. These formats are usually called clipboard formats. There are some predefined formats for simple texts, bitmaps, files, GIFs, etc. When an object is dropped somewhere, if a user indicates to delete the original object, and this is called a move. If the original object is kept in place, it's called a copy. Move or Copy is called the drop effect. During the drag and drop operation, a user generally needs some feedback. For instance, he needs to know when dragging starts, or what object is being dragged. Also, when he moves his cursor over different windows, he needs to know which one is a potential drop target, and for which drop effect (copy or move). These operations must be performed by the drop source and the drop target. Also, the drop source and the potential drop targets need to know what is going on during the dragging. For instance, the drop source wants to know when the object is dropped, and with which drop effect. On the other side, the drop target needs to know which formats are available for the objects being dragged over him. Depending on the formats, he will or will not accept the drop.

To preserve a good interoperability between applications, as well as a coherent look and feel, the communication protocols between the drop source, the drop target and the data object, are usually defined by the system. For instance, drag and drop under Windows is done using OLE, which itself is based on COM. Applications implementing drag and drop often use system libraries.

Envoii Implementation of Drag&Drop

According to specific embodiments of the invention, because Envoiis perform cross-platform, the invention, rather than including its own drag and drop libraries wraps the system drag and drop features inside classes. According to specific embodiments of the invention, there are 4 of these classes: (1) nvDropSource implements a drop source; (2) nvDropTarget implements a drop target; (3) nvDataObject implements a data object; and (4) nvDataSource is a convenience class to ease the creation of the data object at the drop source. nvDropSource and nvDropTarget are base classes that are derived to implement some virtual methods. nvDataObject and nvDataSource are convenience classes that can be used as is. All these classes are defined in dragdrop.h, dragdropwin.h, dragdropwin.cpp (available in/common).

nvDropSource nvDropSource is used to define the behavior of the drop source during dragging. The methods defined here are called repeatedly by the system during the operation. The drop source is the one who controls when a drag an drop ends (by a drop or a cancellation). Also, it can reflect the status of the dragging in any manner via the OnGiveFeedback( )method. A drop source must be linked to a window, and this window must be registered with the system as a potential source of drag and drop. This is performed with the method Register( ). Example code follows:

```
class nvDropSource
```

```
{public:
// register a window as the drop source
bool Register (NVWINDOW hWnd) {m_hWnd=hWnd; return true;}
// unregister a window
void Revoke (void) {m _hWnd=NULL;}
// get acces to window handle
NVWINDOW GetWindow(void) const {return m_hwnd;}
// After dragging has begun, this function is called repeatedly by the framework until the drag
operation is either canceled or completed. Override this function if you want to change the point
at which dragging is canceled or a drop occurs.
// The default implementation initiates the drop or cancels the drag as follows. It cancels a drag
operation when the ESC key or the right mouse button is pressed. It initiates a drop operation
when the left mouse button is raised after dragging has started. Otherwise, it returns S_OK and
performs no further operations.
virtual eDRAGRESULT OnQuerycontinueDrag (bool bEscapePressed, unsigned unsigned long
dwKey State);
// Called by the framework after calling OnDragOver or DragEnter.
// Override this function to provide feedback to the user about what would happen if a drop
occurred at this point.
// The default implementation uses the OLE default cursors.
virtual bool OnGiveFeedback (unsigned long dwDropEffect); }
``` nvDropTarget nvDropTarget defines the behavior on the target side, so there is a little more to do than on the source. A drop target must be linked to a window, and this window must be registered with the stem as a potential target of drag and drop. This is performed with the method Register( ). Example code follows:

```
class nvDropTarget
{ public:
// register a window as a potential drop target
bool Register(NVWINDOW hWnd);
// unregister a window as a potential drop target
void Revoke (void);
// get acces to window handle
NVWINDOW GetWindow(void) const {return m_hWnd;}
// Called by the framework when the cursor is first dragged into the window. Override this
function to allow drop operations to occur in the window. The default implementation calls
CView::OnDragEnter, which simply returns
// NV_DROPEFFECT_NONE by default.
virtual unsigned long OnDragEnter(nvDataObject *pObj, long x, long y, unsigned long
dwKeyboard);
// Called by the framework when the cursor is dragged over the window.
// This function should be overridden to allow drop operations to occur in the window. The
default implementation of this function returns DROPEFFECT_NONE by default. Because this
function is called frequently during a drag-and-drop operation, it should be optimized as much
as possible.
virtual eDROPEFFECT OnDragOver(nvDataabject *pObj, long x, long y, unsigned long
dwKeyboard);
// Called by the framework when the user releases a data object over a valid drop target. The
default implementation is to do an assertion. Override this function to implement the drop.
Returns true if ok
virtual bool OnDrop(nvDataObject *pObj, eDROPEFFECT dropEffect, long x, long y, unsigned
long dwKeyboard);
// Called by the framework when the cursor leaves the window while a dragging operation is in
effect. Override this function if you want special behavior when the drag operation leaves the
specified window. The default implementation of this function does nothing
virtual void OnDragLeave(void) { } };
``` nvDataObject nvDataObject is a wrapper around the real data objec. It provides two simple methods: one to retrieve the available formats for the object, and another to retrieve the object itself, in a specific format. The object is returned as a handle, which is a more general object descriptor than a pointer. Each implementation of nvDataObject will need to define its NVOBJECTDATA type (for Windows, it's a HGLOBAL). Same thing for clipboard formats with NVOBJECTFORMAT (for Windows it's a CLIPFORMAT). Example code follows:

```
class nvDataObject
{ // retrieve a handle to the object data in a specific format
NVOBJECTDATA GetGlobalData (NVOBJECTFORMAT cfFormat);
// request if a specific format is available in the data object
bool IsDataAvailable(NVOBJECTFORMAT cfFormat);
```

-continued

```
// attach the data object to the system clipboard
bool AttachClipboard( ); };
``` nvDataSource nvDataSource is another wrapper for a data object, but on the source side. One builds an object by calling CacheGlobalData( ) one or more times (once for each format you want to provide). Then you start the drag and drop by calling DoDradDrop( ). The SetClipboard( )method is discussed later in this document.

```
class nvDataSource
{// stack some data in the nvDropSource
object void CacheGlobalData(NVOBJECTFORMAT cfFormat,
NVOBJECTDATA hGlobal);
// start drag and drop on a drop source
// if pDropSource!=NULL you do not need to provide a hWnd, just
give NULL. This because the drop source has already registered a hWnd
eDROPEFFECT DoDragDrop(bIVWINDOW hWnd, nvDropSource*
pSrc, unsigned long dwEffects);
// attach the data source with the system clipboard.
// the data source must be dynamically allocated bool bSetClipboard(void);
};
```

Other Functions

Three more functions are provided to initialize an Envoii system drag and drop libraries (OLE) according to specific embodiments of the invention to be called once in the application. DD_bRegisterClipboardFormat( ) is needed to register proprietary clipboard formats with the system (so that different applications will not use the same format identifier).

```
// initialize drag n drop
bool DD_bInitDragAndDrop(void);
// terminate drag n drop
void DD_EndDragAndDrop(void);
// register a clipboard format. returns true if ok
bool DD_bRegisterClipboardFormat(const char *pszFormatName,
    NVOBJECTFORMAT& Format);
```

Using the Drag & Drop Classes

Using The Drag & Drop Classes is fairly straightforward. First, identify the windows that will be used for drop sources and targets. There will probably be a C++object wrapping those windows where one will implement drag and drop. Then, derive nvDropTarget to implement the target side. The minimum done for enabling an Envoii is to override OnDragOver( ) and OnDrop( ) As an example, in OnDragOver( ) return the drop effect that will occur in case of a drop. To do that, check what formats are available in the data object. In this example, the only one known is CF_TEXT. If it is there, accept a move or a copy. Example code follows:

```
eDROPEFFECT nvMyDroptarget::OnDragOver (nvDataObject *pObj,
long x, long y, unsigned long dwKeyboard)
{ // if the object has a CF_TEXT format available, we accept COPY and
MOVE
if (pObj->IsDataAvailable(CF_TEXT))
{ // if ALT is pressed, we consider it's a move
if (dwKeyboard&NV_ALT)
return NV_DROPEFFECT_MOVE;
else
return NV_DROPEFFECT_COPY; }
// if we do not find any acceptable format for us, we refuse a potential
drop
return NV_DROPEFFECT_NONE; }
```

OnDrop( ) is called when the data object is dropped on your drop target. Here it is necessary to check the available formats again, and retrieve the data in a format that we can handle:

```
bool nvMyDroptarget::OnDrop (nvDataObject *pObj, eDROPEFFECT
dropEffect, long x, long y, unsigned long dwKeyboard)
{// do we have a CF_TEXT?
if (pObj->IsDataAvailable (CF_TEXT))
{// we are accepting a drop, so get a handle on the object being dropped
// in a CF_TEXT format (for this example)
HGLOBAL hText = pObj->GetGlobalData(CF_TEXT);
// get what's inside and display it
char *p= (char*) GlobalLock (hText);
wsprintf(gszText,"%s (%ld,%ld) ",p,x,y);
GlobalUnlock (hText);
GlobalFree (hText); }
// update window
HWND hWnd=Getwindow( );
InvalidateRect (hWnd,NULL,TRUE);
return true; }
```

One needs to instantiate those two classes and register them, which means associate them with windows, and register the whole thing with the system drag and drop. Usually, one instantiates the drop source and the drop target in the object that wraps the window. Usually, a drag and drop is started on every click with the left mouse button. The DoDragDrop( )method will take care not to start the drag and drop before a certain delay, or until you move the mouse (with the button down) outside a specific rectangle around the original click point. So, doing a simple click on a object, the drag does not start and the click is handled normally. Before starting the drag and drop operation, build a data object and wrap it in an instance of nvDataSource. Then start the drag by calling nvDataSource::DoDragDrop( ). Example code follows:

```
void BeginDragAndDrop(HWND hWnd)
{ nvDataSource DataSrc;
HGLOBAL hGlobal;
// allocate global data and copy some text in it
hGlobal=MakeGlobalObject (gszText, strlen(gszText)+1);
// store data in data source
DataSrc.CacheGlobalData(CF_TEXT,hGlobal);
// start drag and drop
eDROPEFFECT res = DataSrc.DoDragDrop(NULL,&DropSrc);
// check result
switch (res)
{ case NV_DROPEFFECT_MOVE:
// the object has been moved
DeleteLocalObject ( );
break;
case NV_DROPEFFECT_COPY:
// the object has been copied break; case NV_DROPEFFECT_NONE:
// drag and drop did not start
DoASimpleLeftClick (hWnd);
// fall thru
case NV_DROPEFFECT_CANCEL:
// drag and drop started but no drop occurred so we need
// to free the data
GlobalFree (hGlobal1);
GlobalFree (hGlobal2);
break;
default:
break; } }
```

Interaction with System Clipboard

With an nvDataObject in which the invention can store whatever is necessary and pass it across applications, it is easy to use the system Clipboard and provide the usual Copy/Cut and Paste feature. Information on clipboard formats is available for various operating systems. Predefined values do not need to be registered.

Copy/Cut

To copy, the invention responds to a CTRL+C (under Windows), builds a data source as for drag and drop, and calls the bSetClipboard( )method of nvDataSource. Now the object is on the clipboard. Any application can paste it using CTRL+V. The invention does not delete the nvDataSource object because the clipboard needs it. Deletion will occur automatically when the reference counting reach 0. To cut is exactly the same procedure, but deleting the local object. Example code follows:

```
void CopyToClipboard(bool bCut)
{ nvDataSource *pDataSrc;
HGLOBAL hGlobal;
// need to allocate a data source because it must stay alive on the clipboard
pDataSrc = new nvDataSource; // ref count set to 1
// allocate global data and copy some text in it
hGlobal=MakeGlobalObject(gszText, strlen(gszText)+1);
pDataSrc->CacheGlobalData(CF_TEXT,hGlobal);
// copy to clipboard
pDataSrc->bSetClipboard ( );
// is this a Cut?
if(bCut)DeleteLocalObject( ) ; }
```

Paste

To answer a CTRL+V, the invention builds an nvDataObject and calls the AttachClipboard( )method. The invention can then ask for available formats with IsDataAvailable( ) and retrieve the data with getGlobalData( ). When the nvDataObject is deleted, the reference to the clipboard is released. Example code follows:

```
void PasteFromClipboard ( )
{ nvDataObject Obj;
// attach the data object to the system clipboard
Obj.AttachClipboard( );
// do we have a CF_TEXT?
if (Obj.IsDataAvailable (CF_TEXT))
{ // do a paste the same way we did a drop in OnDrop( )
... }
// release clipboard
Obj.Release ( ); }
```

Drag and Drop Typedefs to Support Cross-Platform Operation

Because the upper level code must be cross-platform, some basic types of the drag and drop libraries are redefined. Example code follows:

```
// cross platform keyboard state
typedef enum { NV_LBUTTON = MK_BUTTON, // left mouse button is down
NV_RBUTTON = MK_RBUTTON, // right mouse button is down
NV_SHIFT = MK_SHIFT, // shift key is down
NV_CONTROL = MK_CONTROL, // Ctrl key is down
NV_MBUTTON = MK_MBUTTON, // middle mouse button is down
NV_ALT = MX_ALT // Alt key is down } eKEYBOARD;
// cross platform drag result
typedef enum { NV_DRAG_OK=S_OK, // drag and drop must continue
NV_DRAG_CANCEL=DRAGDROP_S_CANCEL, // drag and drop must be cancelled
NV_DRAG_DROP=DRAGDROP_S_DROP // a drop must occur
} eDRAGRESULT;
// cross platform drop effect
typedef enum {NV_DROPEFFECT_NONE = DROPEFFECT_NONE,
NV_DROPEFFECT_COPY = DROPEFFECT_COPY,
NV_DROPEFFECT_MOVE = DROPEFFECT_MOVE,
NV_DROPEFFECT_LINK = DROPEFFECT_LINK, // not used
NV_DROPEFFECT_SCROLL= DROPEFFECT_SCROLL, // not used
NV_DROPEFFECT_CANCEL } eDROPEFFECT;
// cross platform window handle
typedef HWND NVWINDOW;
// cross platform object data handle
typedef HGLOBAL NVOBJECTDATA;
```

15. Composability

According to specific embodiments of the present invention, the invention provides PIAs with a compositional model of content. This means that an Envoii web page, for example, is a hierarchical composition of various envoiis. The root of this hierarchy is the special envoii called PlaceVoii, because it represents a place that envoiis can exist. The children of this PlaceVoii are other envoiis.

Further, according to specific embodiments of the present invention, any envoii can dynamically become a child (part of) any other envoii. This capability is referred to herein as composability. Since each envoii in a composition is self-contained and autonomous, this enables a new model of software construction: (1) Users can personalize their experience and compose and aggregate useful envoiis in any configuration without loss of functionality. (2) Businesses can dynamically add new functionality, or upgrade old functionality in already deployed applications simply by sending new envoiis to their users. (3) Businesses can offer premium services, embodied as envoiis, to their users. Because of envoiis' built-in tracking capability, these services can be offered on an ASP or per-use basis. (4) Designers can rapidly develop new envoiis by "snapping together" already existing envoiis and customizing.

16. Further Implementation Examples According to Specific Embodiments (C++ Projects)

Bootstraps

According to further embodiments, bootstraps can be used to automatically install player components when an Envoii is encountered. Bootstraps are small applications or plugins that can instantiate the Envoii player. There is usually one bootstrap for each kind of place. The first thing that a bootstrap does is to locate the ORB and load it. From there, it calls the ORB to instantiate different player objects that are needed to run (MetaVoii, PlaceVoii). Usually, the bootstrap transfers some data called boot data to the player. For example, a .nvx file.

| Project Name | Output | Description |
| --- | --- | --- |
| Bootapp | bootapp.exe | Bootstrap to test the player with a .nvo file on the command line (-nvo xxx.nvo) |
| Bootdesk | bootdesk.exe | Bootstrap for the desktop (see Desktop Implementation Section) |
| Bootplugin | ntnvo.dll | Bootstrap for IE or Netscape. It's a Netscape plugin. It should be copied in your plugin directory |
| Bootpalm | bootpalm.exe | Palm proxy, used to drop Envoiis and send them to the Palm |
| Bootstore | bootstore.exe | Storage application for users to keep the Envoiis they like. It's like bootapp but looks better and automatically persists the Envoiis in it. |
| BootAcx | bootacx.dll | Envoii ActiveX control. Can be used in web pages but also in Word documents, Excel Sheets, etc. |
| BootCGI | bootcgi.exe | Bootstrap to run Server Voys on the Envoii server. This executable implements the CGI protocol used by web servers |

Components

Components are dynamic link libraries exposing a standard set of functions that the ORB can call to instantiate objects. Each component provides a set of objects referenced through their class Ids, and used through interfaces. Only the ORB should load components.

Applications live on the client side or the server side. Some of them are launched by the client. Others can be launched by the player itself. On the server side, applications can be started by the administrator, or by any service like a web server, for example.

| Project Name | Output | Description |
| --- | --- | --- |
| ComMgr | commgr.dll | Provides the ComManager object (see Communication Manager Section) |
| Envoii | Envoii.dll | Provides Skin Voiis, Vizvoys, Envoiis (see Skin Voiis Section) and all the basic runners. |
| EJVM | ejvm.dll | Java virtual machine |
| Meta Voii | MetaVoii.dll | Provides the Meta Voii object. The Meta Voii is the top level object. It holds a list of all the Place Voiis on the machine. |
| Midivoy | midivoy.dll | Provides Midistartervoy to play midi files |
| Nvorb | nvorb.dll | Provides the ORB object with which you can instantiate any object from any component (see ORB and Components section) |
| Oldvoylib | oldvoylib.dll | Provides all oldvoys (sphere, liberty, explosion, etc) |
| OpenGL Voy | openglvoy.dll | Wraps the OpenGL Api in an Envoii (see/samples/runners for examples) |
| Place Voii | PlaceVoii.dll | Provides the different Place Voii objects (app, desktop, plugin & palm proxy) |
| Plugin Voy | pluginvoy.dll | Provides the pluginvoy object which can wrap any Netscape Plugin (tested with ReadVideo, Quicktime, Flash Cult 3D) |
| RunnersLib | runnerslib.dll | More runners (the basic ones are in Envoii.dll) |
| Skeleton | skeleton.dll | Component skeleton. Can be used to create a new component |
| Widgets | widgets.dll | All widgets skins are implemented here (forms, buttons, sliders, check boxes, radio buttons, text, etc). |

Core Libraries

Core libraries are statically linked to other dlls, mainly components, but also applications. That means Core libraries are loaded automatically by the system, which implies that they generally must be accessible by the system before starting the player with a bootstrap.

| Project Name | Output | Description |
| --- | --- | --- |
| Core | nvcore.dll | All shared classes are compiled and exported in nvcore (nvstring, nvarray, nvlist, etc) |
| Oldcore | oldcore.dll | All shared classes from the old player. Used by Oldvoylib only. |

Applications

| Project Name | Output | Description |
| --- | --- | --- |
| Installer | installer.exe | Installs the player on a client machine. Copy the files at the right place, set up the registry, etc. (see Player Installer section). Is also used to check for player update (see Player Update section), and display the control panel (called from BootDesk). |
| TrackVoii | TrackVoii.exe | Tracking manager. The one who gathers tracking data and send it to the tracking server. Started periodically by Envo (see Tracking section) |
| NvDev | nvdev.exe | Development Environment for Envoii compositions. |
| Jikes | jikesdll.dll | Java compiler object used by NvDev |

ServerVoys

ServerVoys are Envoii services running on the Envoii Server. Those objects are created and used by BootCGI on HTTP requests from clients. ServerVoys are used for tracking, playerID registration, component download, player update & Community servers.

| Project Name | Output | Description |
| --- | --- | --- |
| s_Envoii | s_Envoii.exe | Implements all basics services (tracking, playerID registration, component download, player update) for SQL Server 2000. |
| TrackServ | trackserv.dll | NT Service to read tracking reports and insert the corresponding records in our SQL Server 2000 database. |

17. Further Implementation Examples According to Specific Embodiments of the Invention Components A component is a piece of executable code that provides objects. If one needs a FooBar object, there is provided a standard way to ask a component for that class of object (usually an exported function of a dll). One provides some kind of class identifier, some interface identifier and the component provides a pointer on an object. When the object is not needed any more, one of its methods is called to release it.

Objects and Interfaces

An object can be seen as a simple C++object, that is an instantiation of a C++class. Each class has a unique identifier (throughout the world) that provides for class identity. A component can implement several classes. An interface is a set of methods to access an object. The same interface can be used on different classes. A class can implement several interfaces. When a component is asked to create an object it does not return a pointer on the object but an interface to it. Most of the time it is the same, but sometimes not. In a particular embodiment, interfaces are C++ abstract classes. All interfaces inherit a base interface called nvIUnknown that implements reference counting and interface querying. In this example, this class can be defined in /common/nvcom.h.

```
class nvIUnknown { private:
// reference count
long m_RefCnt;
```

-continued

```
public:
// constructor
nvIUnknown (void) {m_RefCnt=0; }
// destructor
virtual ~nvIUnknown( );
// add a reference to the object
virtual long AddRef (void);
// release a reference to the object (auto delete if not referenced any more)
virtual long Release(void);
// query interface
virtual int QueryInterface(const IID & iid, void **ppObj) = 0; };
```

Unique Identifiers

Unique identifiers are pseudo-random numbers that are unique in the world. According to specific embodiments of the present invention a COM-like format can be used for IDs (128 bits) and the COM ID generator GUIDGEN.EXE can be used to generate IDs. IDs are stored in a GUID structure taken from COM, such as the example below:

```
// structure for unique identifiers
typedef struct _GUID
{ unsigned long Data1;
unsigned short Data2;
unsigned short Data3;
unsigned char Data4 [ 8 ] ; } GUID ;
Example of a clsid:
#define CLSID_FooBar {0x70f73d81, 0x662, 0x11d4, 0x8d, 0xae, 0x0, 0x50, 0xda, 0xc3, 0x5d, 0xa}
```

Class Factory

Components do not export functions to create objects directly. This is because it would not work for out-processor components (executables). So instead they provide class objects, also called factories. These factories are C++ objects with a default interface called nvIFactory (defined in nvcom.h). Their method nCreateInstance( ) is the one who provides the objects themselves. There is one factory for each class implemented by a component. That is why the method nCreateInstance( ) shown below does not have a class id parameter.

```
class nvIFactory : public nvIUnknown { public:
// Returns an iid interface on a clsid object. When done with the object,
virtual int nCreateInstance(nvIUnknown *pOuter, const IID & iid, void **ppObj) = 0;
// lock factory
virtual int LockServer(bool bLock) = 0; };
```

An example of the steps to create a FooBar object are the following: (1) ask the component for a FooBar factory; (2) ask the FooBar factory object to create an instance of FooBar and return an interface on it; (3) release the factory object. FooBar can have multiple interfaces. In step 2, specify one of them. If later it another interface is desired on the same FooBar object, call the QueryInterface( )method of the FooBar object itself. Generally, it is necessary to release ALL the interfaces that you get, either with nCreateInstance( ) or QueryInterface( ) //query interface int nvIUnknown::QueryInterface(const IID & iid, void **ppObj);

Building a Component

/src/skeleton is an example of a component. It implements two classes: Skeleton and Skeleton2, and two interfaces: ISkeleton and ISkeletonFoo. The source are organized as follow:

| File | Objectives |
|---|---|
| nversion.h | version information for your component |
| nvtracepr.h | debugging levels for your component |
| dllmainwin.cpp | system dependent file that implements the entry points of the dll. There is nothing to change in here, except the declaration of the nvDllComponent object. |
| dllcomp.h | definition of class nvDllComponentXXXX. This class inherits nvDllComponent defined in nvcom.h and provides the DllGetFactory method |
| dllcomp.cpp | implementation of nvDllComponentXXXX defined in dllcomp.h. Here you just need to add the classes of your component in the nDllGetFactory method |
| skeleton.h | this .h is the only .h that the client should need to use a Skeleton object. It contains the definition of all the interfaces provided by the component, as well as the class ids and interface ids to provide the ORB with. Of course, you should rename this file. |
| skelimp.hi | definition of class Skeleton and its factory |
| skelimp.cpp | implementation of class Skeleton and its factory |
| skel2limp.h | definition of class Skeleton2 and its factory |
| skel2immp.cpp | implementation of class Skeleton2 and its factory | nvObject—This is the root class. All classes inherit from it. It gives the ability to have a central access point to all objects in the code. For example, allowing the code to modify the way objects memory allocation is handled, or provide polymorphic persistence mechanisms. Indexed list—Can use resizable indexed lists as they are faster to traverse and lighter in memory.

18. COM-Like Example Architecture

Below is a discussion of a COM-like example architecture according to specific embodiments of the present invention. This discussion provides a very basic example of how to define classes that will work in Envoii components according to specific embodiments of the present invention and be usable by the ORB and provides further information regarding processing behind the scenes. This document is a wrapper for a C++ file. According to specific embodiments of the invention, this particular architecture defines three different classes: class Node; class Envoii, which inherits class Node; class PlaceVoii, which inherits class Envoii, and for each class, the equivalent interface: class Inode; class IEnvoii; class IPlaceVoii. Two functions to create the right objects are created: GetPlaceVoii and GetEnvoii. In reality, this is done by the ORB which gets factories from the components and ask those factories to create the objects.

Important Rules

To design classes and interfaces that will work in this example COM-like, the following rules should be respected:

1. All interface inherits class nvIUnknown, as stipulated in COM. This is to allow anybody who has an interface on an object (=a pointer) to query another interface using the QueryInterface method of nvIUnknown.

2. Because PlaceVoii and Envoii objects inherits the Node object, and because there must be only one reference counter per object, reference counting is implemented only once, in the base class Node.

3. Because of inheritance between interfaces, define the AddRef and Release method in every class. They can either bounce on the base class, or do the same job.

4. For the same reason, define QueryInterface for every class. Each QueryInterface should only return a pointer for its own interfaces and call the base class QueryInterface for the others. This is to allow the this pointer to be casted correctly. (=offsetted to the right virtual table).

5. A QueryInterface that succeeds should do an AddRef( ).

6. All methods of all interfaces must be virtual. Destructors MUST be virtual too.

Example Code (oop.cpp)

```
// fake interface ids (just enums)
enum { IID_UNKNOWN, IID_NODE, IID_ENVOII, IID_ENVOIIBIS, IID_PLACEVOII,
IID_PLACEVOIITER, IID_PLACEVOIIBIS };
// interface definition (fake QueryInterface)
// All interfaces inherit nvIUnknown. This is the only part of the code that a client would get in a
separate.h)
class nvIUnknown { public:
virtual int AddRef(void) = 0;
virtual int Release(void) = 0;
virtual int QueryInterface(void **ppObj, int nInterf) = 0; };
class INode: public nvIUnknown { public:
virtual int FuncInode(void) = 0; };
class IEnvoii: public nvIUnknown { public:
virtual int FuncEnvoii(void) = 0; };
class IEnvoiiBis: public nvIUnknown { public:
virtual int FuncEnvoiiBis(void) = 0; };
class IPlaceVoii: public nvIUnknown { public:
virtual int FuncPlaceVoii(void) = 0;
virtual int FuncPlaceVoii2(void) = 0; };
// example of interface inheriting another interface (interface extension)
class IPlaceVoiiBis: public IPlaceVoii { public:
virtual int FuncPlaceVoiiBis(void) = 0; };
// example of interface inheriting another interface (interface extension)
// with 2 levels of inheritance
class IPlaceVoiiTer: public IPlaceVoiiBis { public:
virtual int FuncPlaceVoiiTer(void) = 0; };
//-------------------------------------------------------------------------------
// Class definition: known and compiled only in the component. Only the very base class
implements reference counting. All classes inherit their interface, plus the base classes that they
need. All destructors need to be virtual (this is for the Release to work) AddRef( ), Release( ) and
QueryInterface( ) must be defined in each class All QueryInterface( ) should bounce on the base
class but only for the interfaces that they inherited via the base class. When a class inherits
multiple interface (like class Envoii), the QueryInterface should cast the this pointer accordingly
//-------------------------------------------------------------------------------
class Node : public INode { private:
int m_Foo;
protected:
// reference counter implemented only once
int m_RefCnt;
public:
// constructor of very base class only should set ref counter to 0
Node(void) : m_RefCnt(0) { }
virtual ~Node( );
virtual int FuncInode(void);
// nvIUnknown interface implementation
int QueryInterface(void **ppObj, int nInterf);
int AddRef (void);
int Release(void); };
// example of multiple interface inheritance
class Envoii : public IEnvoii, public IEnvoiiBis, public Node {int bidule;
public:
virtual ~Envoii( );
int FuncEnvoii(void);
int FuncEnvoiiBis(void);
// nvIUnknown interface implementation
int QueryInterface(void **ppObj, int nInterf);
int AddRef(void);
int Release(void); };
class Place : public Envoii { int chose;
public:
virtual ~Place( ) { }
int FuncPlace(void); };
// WARNING: here the order of the inheritance is very important.
// The interfaces should appear first, and then the inherited classes class PlaceVoii : public
IPlaceVoiiTer, public Place { int chose; public:
virtual ~PlaceVoii( );
int FuncPlaceVoii(void);
int FuncPlaceVoii2(void);
int FuncPlaceVoiiTer(void);
int FuncPlaceVoiiBis(void);
// nvIUnknown interface implementation
int QueryInterface(void **ppObj, int nInterf);
int AddRef(void);
int Release(void); };
// here we just make thing a little more complex
// by inheriting Placevoii without adding any interface class PlaceVoiiDesktop : public PlaceVoii
{ private:
int DeskSpecific; };
//-------------------------------------------------------------------------------
Node::~Node( )
```

```
{ int u=0; }
int Node::FuncInode(void)
{ return 3; }
int Node: :QueryInterface(void **ppObj, int nInterf)
{ switch(nInterf) {
case IID_UNKNOWN:
case IID_NODE:
*ppObj = this; break;
default:
return -1; }
AddRef( );
return 0; }
int Node::AddRef(void)
{ // we implement ref counting in the very base class only return ++m_RefCnt; }
int Node::Release(void)
{ // we implement ref counting in the very base class only m_Refcnt--;
// WARNING: delete this will work because all destructors are virtual if(m_Refcnt==0) {delete
this; return 0;}
return m_Refcnt; }
//----------------------------------------------------------------------------------------
int Envoii::FuncEnvoii(void)
{ return 1; }
int Envoii::FuncEnvoiiBis(void)
{ return 111; }
int Envoii::QueryInterface(void **ppObj, int nInterf)
{ switch (nInterf)
{ case IID_ENVOII:
// the cast here is very important.
// this is why the multiple inherited interfaces work.
*ppObj = (IEnvoii*)this;
break;
case IID_ENVOIIBIS:
*ppObj = (IEnvoiiBis*)this;
break;
default:
return Node: :QueryInterface(ppObj, nInterf); }
AddRef( );
return 0; }
Envoii::~Envoii( )
{ int u=0; }
int Envoii::AddRef(void)
{ return Node::AddRef( ); }
int Envoii: :Release(void)
{ return Node::Release( ); }
//----------------------------------------------------------------------------------------
int PlaceVoii: : FuncPlaceVoii(void)
{ return 2; }
int PlaceVoii::FuncPlaceVoii2(void)
{ return 20; }
int PlaceVoii: FuncPlaceVoiiTer(void)
{ return 30; }
int PlaceVoii::FuncPlaceVoiiBis(void)
{ return 40; }
int PlaceVoii::QueryInterface(void **ppObj, int nInterf)
{ switch (nInterf)
{ case IID_PLACEVOII:
case IID_PLACEVOIITER:
case IID_PLACEVOIIBIS:
// here we do not need to cast the pointer because interfaces inherit each other
*ppObj = this;
break;
default:
return Envoii::QueryInterface(ppObj, nInterf); }
AddRef( );
return 0; }
int PlaceVoii::AddRef(void)
{ return Envoii::AddRef( ); }
int PlaceVoii::Release(void)
{ return Envoii::Release( ); } Place Voii::~PlaceVoii( )
{ int u=0; }
// Factory functions
void GetPlaceVoii(void **ppObj, int nInterf)
{ PlaceVoiiDesktop *p = new PlaceVoiiDesktop;
p->QueryInterface(ppobj, nInterf); }
//----------------------------------------------------------------------------------------
void GetEnvoii (void **ppObj, int nInterf)
{ Envoii *p = new Envoii;
p->QueryInterface(ppObj, nInterf); }
// Code that would be on the client side
int WINAPI WinMain(HINSTANCE , HINSTANCE , LPSTR , int)
```

```
{ // create a Placevoii and request an INode interface
INode *pObj;
GetPlacevoii((void**)&pObj ,IID_NODE);
// now call methods of the INode interface on the PlaceVoii object if(pObj->FuncInode( ) !=3)
{assert(0) ;}
// now ask the object for another interface, an IEnvoii interface IEnvoii *pObj2;
pObj->QueryInterface((void**)&pObj2,IID_ENVOII);
// we can release the INode interface pObj->Release( );
// now we can call methods of the IEnvoii interface on the PlaceVoii object
if(pObj2->FuncEnvoii( ) !=1) { assert(0);}
// now ask the object for another interface, an IEnvoii interface IEnvoiiBis *pObj6;
pObj2->QueryInterface((void**)&pObj6,IID_ENVOIIBIS);
// we can release the INode interface
pObj2->Release( );
// now we can call methods of the IEnvoii interface on the PlaceVoii object
if(pObj6->FuncEnvoiiBis( ) !=111) {assert(0) ;}
// now ask the object for another interface, an IPlaceVoii interface IPlaceVoii *pObj 3;
pObj6->QueryInterface( (void**) &pObj3,IID.sub.'PLACEVOII);
// we can release the IEnvoii interface
pObj6->Release( );
// now we can call methods of the IPlaceVoji interface on the Placevoii object
if(pObj3->FuncPlaceVoii( ) !=2) {assert(0);}
if(pObj3->FuncPlaceVoii2( ) !=20) {assert(0);}
// now ask the object for another interface, an IPlaceVoiiTer interface IPlaceVoiiTer *pObj 4;
pObj3->QueryInterface((void**)&pObj4,IID_PLACEVOIITER);
// we can release the IPlaceVoii interface, the PlaceVoii is deleted pObj3->Release( );
// now we can call methods of the IPlaceVoiiTer interface on the PlaceVoii object
if(pObj4->FuncPlaceVoiiTer( ) !=30) {assert(0) ;}
// now ask the object for another interface, an IPlaceVoiiBis interface IPlaceVoiiBis *pObj5;
pObj4->QueryInterface( (void**) &pObj5,IID_PLACEVOIIBIS);
// we can release the IPlaceVoiiTer interface pObj4->Release( );
// now we can call methods of the IPlaceVoiiBis interface on the PlaceVoii object
if(pObj5->FuncPlaceVoiiBis( ) 1=40) {assert(0) ;}
// we can release the IPlaceVoiiBis interface, the PlaceVoii is deleted pObj5->Release( );
// let's create a Envoii and request an IEnvoii interface
GetEnvoii((void**)&pObj2,IID_ENVOII);
// now we can call methods of the IEnvoii interface on the Envoii object
if(pObj2->FuncEnvoii( )!=1) {assert(0);}
// now ask the object for another interface, an INode interface
pObj2->QueryInterface ((void**) &pObj , IID_NODE);
// we can release the IEnvoii interface
pObj2->Release( );
// now we can call methods of the INode interface on the Envoii object
if(pObj->FuncInode( ) !=3) {assert(0);}
// we can release the INode interface, the Envoii is deleted
pObj->Release( );
return 0;)
```

19. Further Example Architecture

FIG. 30 is a block diagram illustrating atop level software architecture at a client machine according to specific alternative embodiments of the invention. Shown in FIG. 30 are many of the components discussed above. According to this specific embodiment, however, both MetaVoiis and the ORB exist in multiple instances at a user site to interact with different PlaceVoiis.

20. Embodiment in a Programmed Information Appliance

FIG. 31 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 31 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

21. Other Embodiments

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, etc.

In addition, channels have been described primarily as traditional network connections, with the appropriate corresponding hardware. However, channels are meant to be any channels capable of carrying data, including wireless channels, optical channels, and electrical channels.

It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety. Conclusion The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A method comprising:
accessing a first information agent using a first application operating on a first data processing system;
selecting the first information agent and electronically relocating the first information agent outside of the first application;
determining whether sufficient logic exists to allow the first information agent to operate in a new location;
contacting an agent server operating on a second data processing system to request the logic; and
moving the first information agent to the new location using the first system and the second system.

2. The method of claim 1 wherein the first application is an email client and the first information agent is an email message.

3. The method of claim 1 comprising determining whether infrastructure logic exists to allow the first information agent to operate in the new location.

4. The method of claim 3 comprising contacting an agent server to request the infrastructure logic.

5. The method of claim 3 further comprising downloading and installing the infrastructure logic.

6. The method of claim 3 further comprising accessing a second information agent by a second application, wherein the second information agent is composed into the first information agent.

7. The method of claim 1 comprising selecting the new location from a desktop provided by an operating system, a different application, and a different computer platform with a different operating system.

8. A method comprising:
accessing a first information agent by a first application operating on a first data processing system;
electronically relocating the first information agent outside of the first application;
electronically determining if sufficient logic exists to allow the first information agent to operate in a new location;
contacting an agent server operating on a second data processing system to request the logic;
downloading and installing the logic;
relocating the first information agent to the new location subsequent to the installation of the logic;
determining if infrastructure logic exists to allow the first information agent to operate in the new location; and
contacting an agent server to request the infrastructure logic.

9. The method of claim 8 wherein the first application is an email client and the first information agent is an email message.

10. The method of claim 8 comprising downloading and installing the infrastructure logic.

11. The method of claim 8 further comprising:
accessing a second information agent by a second application; and
composing the second information agent into the first information agent.

12. A method comprising:
accessing a first application operating on a first data processing system using a first information agent;
configuring a first system for allowing selection of the first information agent and electronic relocation of the first information agent outside of the first application;
configuring a second system for electronically determining if sufficient logic exists to allow the first information agent to operate in a new location;
configured the second system for contacting an agent server operating on a second data processing system to request the logic;
configured the second system for downloading and installing the logic; and
relocating the first information agent to the new location subsequent to the installation of the logic.

13. The method of claim 12 wherein the first application is an email client and the first information agent is an email message.

14. The method of claim 12 comprising configuring the second system to determine whether infrastructure logic exists to allow the first information agent to operate in the new location.

15. The method of claim 14 comprising configuring the second system to contact an agent server to request the infrastructure logic.

16. The method of claim 14 comprising configuring the second system to download and install the infrastructure logic.

17. The method of claim 14 further comprising:
accessing a second information using a second application; and
composing the second information agent into the first information agent.

18. The method of claim 12 further comprising selecting the new location from a desktop provided by an operating system, a different application, and a different computer platform with a different operating system.

* * * * *